(12) United States Patent
Gupta et al.

(10) Patent No.: US 10,592,830 B2
(45) Date of Patent: Mar. 17, 2020

(54) METHOD AND SYSTEM FOR MANAGING ONE OR MORE HUMAN RESOURCE FUNCTIONS IN AN ORGANIZATION

(71) Applicant: Conduent Business Services, LLC, Florham Park, NJ (US)

(72) Inventors: Manoj Gupta, Bangalore (IN); Alefiya Lightwala, Indore (IN); Partha Dutta, Bangalore (IN); Seshadri Thirumalai Echampadi, Chennai (IN); Prince Gerald Albert, Chennai (IN); Vivek Harikrishnan Ramalingam, Trichy (IN)

(73) Assignee: CONDUENT BUSINESS SERVICES, LLC, Florham Park, NJ (US)

( * ) Notice: Subject to any disclaimer, the term of this patent is extended or adjusted under 35 U.S.C. 154(b) by 656 days.

(21) Appl. No.: 14/798,494

(22) Filed: Jul. 14, 2015

(65) Prior Publication Data
US 2017/0017914 A1   Jan. 19, 2017

(51) Int. Cl.
*G06Q 10/00* (2012.01)
*G06Q 10/06* (2012.01)
*G06Q 10/10* (2012.01)

(52) U.S. Cl.
CPC .  *G06Q 10/063112* (2013.01); *G06Q 10/1053* (2013.01)

(58) Field of Classification Search
CPC .......................................... G06Q 10/00–50/00
USPC ................................................ 705/7.11–7.42
See application file for complete search history.

(56) References Cited

U.S. PATENT DOCUMENTS

| 7,827,125 B1 * | 11/2010 | Rennison .............. G06F 16/319 706/14 |
| 8,280,823 B1 | 10/2012 | Obeid |
| 8,407,073 B2 | 3/2013 | Bagheri et al. |
| 9,104,997 B1 * | 8/2015 | Balasubramanian .. G06Q 10/06 |
| 2002/0055866 A1 * | 5/2002 | Dewar ............. G06Q 10/06311 705/7.38 |

(Continued)

OTHER PUBLICATIONS

Chapman, Derek S., and Jane Webster. "The use of technologies in the recruiting, screening, and selection processes for job candidates." International journal of selection and assessment 11.2-3 (2003): 113-120. (Year: 2003).*

(Continued)

*Primary Examiner* — Alan S Miller
*Assistant Examiner* — Mustafa Iqbal
(74) *Attorney, Agent, or Firm* — Jones Robb, PLLC

(57) ABSTRACT

According to embodiments illustrated herein, a method and a system is provided for screening candidates for job opportunities. The method includes grouping the candidates into batches based on predetermined time duration, a count of the candidates, and a chronology of receiving job applications from the candidates. Each batch comprises a first set of candidates. Thereafter, a sliding window is moved over the batches, to encompass a set of batches at a first time instance. A second set of candidates is identified from the first set of candidates in a batch from the set of batches based on a score assigned to each of the first set of candidates during an interview. Further, a candidate is selected from the second set of candidates obtained from a first batch, encompassed by the sliding window at a second time instance before the first time instance.

21 Claims, 8 Drawing Sheets

(56) References Cited

U.S. PATENT DOCUMENTS

| | | | |
|---|---|---|---|
| 2003/0037032 A1 | 2/2003 | Neece et al. | |
| 2006/0203840 A1 | 9/2006 | Scott | |
| 2006/0229902 A1* | 10/2006 | McGovern | G06Q 10/06 705/321 |
| 2006/0235884 A1* | 10/2006 | Pfenninger | G06Q 10/10 |
| 2011/0208664 A1* | 8/2011 | Rahman | G06Q 10/06 705/321 |
| 2011/0238591 A1* | 9/2011 | Kerr | G06Q 10/06 705/321 |
| 2014/0032436 A1 | 1/2014 | Patel | |
| 2014/0122355 A1 | 5/2014 | Hardtke et al. | |
| 2014/0129465 A1* | 5/2014 | Baeck | G06Q 10/1053 705/321 |

OTHER PUBLICATIONS

Sameep Mehta, Rakesh Pimplikar, Amit Singh, Lav R. Varshney, Karlhik Visweswariah: Efficient multifaceted screening of job applicants. EDBT. 2013.

Ahmed Helmi. The Hiring Problem and its Algorithmic Applications. PhD Thesis, Apr. 2013.

A. Z. Broder, A. Kirsch, R. Kumar, M. Mitzenmacher, E. Upfal, and S. Vassilvitskii. The hiring problem and Lake Wobegon strategies. In Proceedings of the $19^3$ Annual ACM-SIAM Symposium on Discrete Algorithms (SODA'08), pp. 1184-1193. SIAM, Philadelphia, PA, USA, 2008.

Aksin, Z., Armony, M., Mehrotra, V., The Modern Call-Center: A Multi-Disciplinary Perspective on Operations Management Research. Production and Operations Management. 2007.

* cited by examiner

METHOD AND SYSTEM FOR MANAGING ONE OR MORE HUMAN RESOURCE FUNCTIONS IN AN ORGANIZATION

TECHNICAL FIELD

The presently disclosed embodiments are related, in general, to human resource systems. More particularly, the presently disclosed embodiments are related to methods and systems for managing one or more human resource (HR) functions in an organization.

BACKGROUND

With increasing attrition rates and shortage of qualified talent pool in the industry, personnel management and talent acquisition, are not easy tasks for an organization. The organization may obtain information about potential candidates for its job openings from one or more of, but not limited to, online job portals, recruitment agencies, and human resource consultants. After obtaining the information about the potential candidates, the organization may conduct one or more selection/screening rounds to evaluate the potential candidates for the job openings. After evaluating the potential candidates, a hiring manager of the organization may select one or more suitable candidates from the potential candidates for the job openings.

In certain scenarios, the hiring manager may decide to delay the decision of hiring a candidate for a job opening such that the organization may screen through more candidates for the job opening in the meanwhile. In such a scenario, the organization may risk losing out the candidate, as the candidate may not want to wait until screening of other candidates. On the contrary, if the hiring manager decides to hire a candidate for a job opening immediately, the organization may risk missing better skilled candidates who may be sourced for the job opening by the organization in future. Hence, there exists a need for a solution to overcome the aforementioned shortcomings related to hiring of candidates for job openings in organizations.

SUMMARY

According to embodiments illustrated herein, there is provided a method for screening one or more candidates for one or more job opportunities. The method includes, in an application server, grouping the one or more candidates into one or more batches based on a predetermined time duration, a count of candidates in the one or more candidates, and a chronology of reception a job application from the one or more candidates, such that each batch comprises a first set of candidates from the one or more candidates. Thereafter, a sliding window is moved over the one or more batches, wherein the sliding window, at a first time instance, encompasses a set of batches from the one or more batches. For a batch in the set of batches, a second set of candidates is identified from the first set of candidates in the batch based on a score assigned to each candidate in the first set of candidates during an interview with the respective candidate. Further, a candidate is selected from the second set of candidates obtained from a first batch that was encompassed by the sliding window at a second time instance before the first time instance.

According to embodiments illustrated herein, there is provided an application server for screening one or more candidates for one or more job opportunities. The application server includes one or more processors configured to group the one or more candidates into one or more batches based on a predetermined time duration, a count of candidates in the one or more candidates, and a chronology of reception a job application from the one or more candidates, such that each batch comprises a first set of candidates from the one or more candidates. Thereafter, a sliding window is moved over the one or more batches, wherein the sliding window, at a first time instance, encompasses a set of batches from the one or more batches. For a batch in the set of batches, a second set of candidates is identified from the first set of candidates in the batch based on a score assigned to each candidate in the first set of candidates during an interview with the respective candidate. Further, a candidate is selected from the second set of candidates obtained from a first batch that was encompassed by the sliding window at a second time instance before the first time instance.

According to embodiments illustrated herein, there is provided a computer program product for use with an application server. The computer program product includes a non-transitory computer readable medium. The non-transitory computer readable medium stores a computer program code for screening one or more candidates for one or more job opportunities. The computer program code is executable by one or more processors in the application server to group the one or more candidates into one or more batches based on a predetermined time duration, a count of candidates in the one or more candidates, and a chronology of reception a job application from the one or more candidates, such that each batch comprises a first set of candidates from the one or more candidates. Thereafter, a sliding window is moved over the one or more batches, wherein the sliding window, at a first time instance, encompasses a set of batches from the one or more batches. For a batch in the set of batches, a second set of candidates is identified from the first set of candidates in the batch based on a score assigned to each candidate in the first set of candidates during an interview with the respective candidate. Further, a candidate is selected from the second set of candidates obtained from a first batch that was encompassed by the sliding window at a second time instance before the first time instance.

BRIEF DESCRIPTION OF DRAWINGS

The accompanying drawings illustrate the various embodiments of systems, methods, and other aspects of the disclosure. Any person with ordinary skills in the art will appreciate that the illustrated element boundaries (e.g., boxes, groups of boxes, or other shapes) in the figures represent one example of the boundaries. In some examples, one element may be designed as multiple elements, or multiple elements may be designed as one element. In some examples, an element shown as an internal component of one element may be implemented as an external component in another, and vice versa. Further, the elements may not be drawn to scale.

Various embodiments will hereinafter be described in accordance with the appended drawings, which are provided to illustrate and not to limit the scope in any manner, wherein similar designations denote similar elements, and in which.

DETAILED DESCRIPTION

Figure 1:
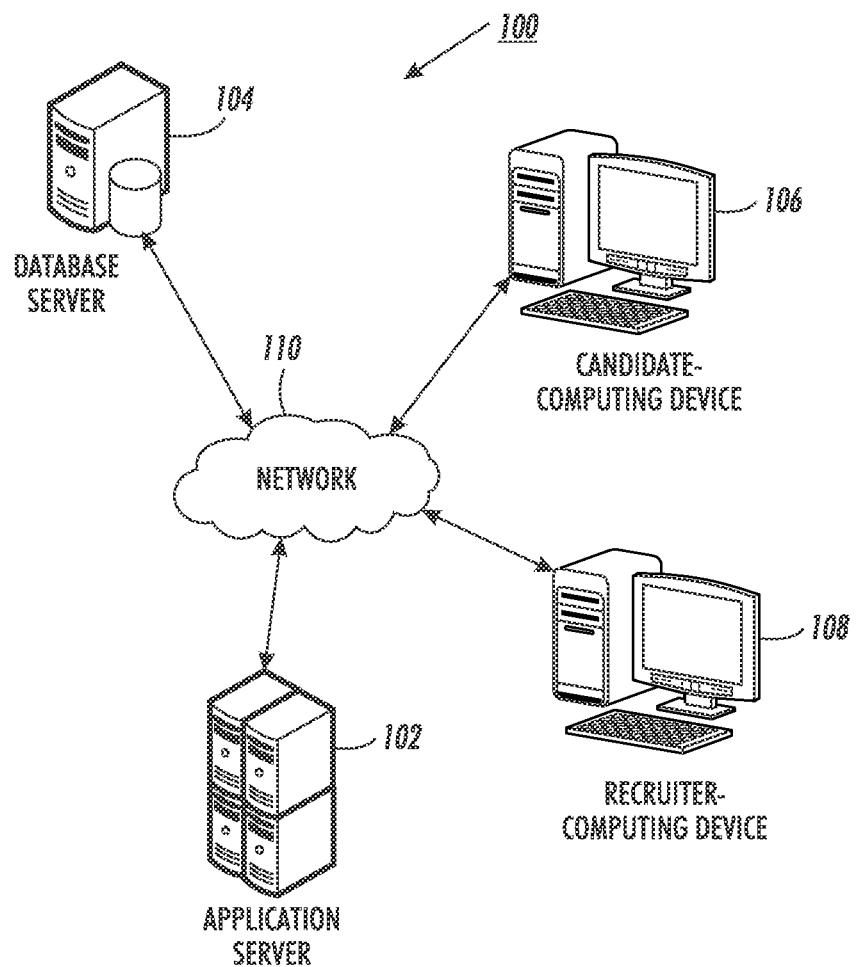
FIG. 1 is a block diagram illustrating a system environment in which various embodiments may be implemented.

The present disclosure is best understood with reference to the detailed figures and description set forth herein. Various embodiments are discussed below with reference to the figures. However, those skilled in the art will readily appreciate that the detailed descriptions given herein with respect to the figures are simply for explanatory purposes as the methods and systems may extend beyond the described embodiments. For example, the teachings presented and the needs of a particular application may yield multiple alternative and suitable approaches to implement the functionality of any detail described herein. Therefore, any approach may extend beyond the particular implementation choices in the following embodiments described and shown.

References to "one embodiment," "at least one embodiment," "an embodiment," "one example," "an example," "for example," and so on indicate that the embodiment(s) or example(s) may include a particular feature, structure, characteristic, property, element, or limitation but that not every embodiment or example necessarily includes that particular feature, structure, characteristic, property, element, or limitation. Further, repeated use of the phrase "in an embodiment" does not necessarily refer to the same embodiment.

Definitions: The following terms shall have, for the purposes of this application, the respective meanings set forth below.

A "job opportunity" refers to a job vacancy/position in an organization. In an embodiment, the organization may receive job applications from one or more candidates interested in the job opportunity. Thereafter, the organization may select at least one candidate from the one or more candidates based on a performance of the one or more candidates in one or more rounds of interview or selection tests.

A "skill requirement" refers to a set of skills that may be required to perform tasks related to a job opportunity. In addition, a candidate selected for the job opportunity may possess at least the skills corresponding to the skill requirement associated with the job opportunity for which the candidate is hired.

A "candidate" refers to an individual who applies for a job opportunity in an organization. In an embodiment, the candidate may apply for the job opportunity by sending his/her job application to the organization.

A "job application" refers to a document that presents a candidate's educational, professional, and personal details to a prospective employer. In an embodiment, the document may correspond to an electronic document.

A "batch of candidates" refers to candidates who may be grouped together for a hiring process at an organization. In an embodiment, a number of candidates in a batch may be fixed. In an embodiment, each candidate in a batch may be ranked with respect to the other candidates in the batch based at least on a score assigned to the candidate during an interview.

"Predetermined time duration" refers to a time span during which at least one batch of candidates may be formed. For example, if the predetermined time duration is 1 week, the candidates whose job applications are received during a particular week may be grouped into one batch. A person having ordinary skill in the art would understand scope of the disclosure is not limited to creating a single batch during the predetermined time period. In an embodiment, multiple batches may be created during the predetermined time period. In such a scenario, the batch size may be fixed.

A "first set of candidates" refer to the group of candidates belonging to a single batch.

A "second set of candidates" refer to a set of top ranking candidates selected from the first set of candidates in a batch. In an embodiment, the top ranking candidates are selected based on the interview. In another embodiment, the second set of candidates are identified based on an employability score associated with each candidate.

A "sliding window" refers to a virtual window that may move over one or more sequentially arranged batches of candidates such that the sliding window may encompass a predetermined number of batches at any given time. In an embodiment, the batches are sequentially arranged based on a chronology of creation of the batches. As the batches are chronologically arranged, the batches within the sliding window are also arranged in a chronological sequence of creation of the respective batches. In an embodiment, the movement of the sliding window may be dependent on creation of a new batch. In an embodiment, when a new batch of candidates is created, the sliding window may move by one batch such that the chronologically oldest batch is deleted from the sliding window, while the chronologically next batch from the one or more batches (e.g., the newly created batch), may be added to the sliding window.

A "skills graph" refers to a graph that includes one or more nodes and one or more edges. In an embodiment, the one or more nodes may represent one or more skills that may be possessed by one or more candidates. Further, the one or more edges may represent a relationship among the one or more skills. In an embodiment, a first skill may be related to a second skill when the first skill is determinable based on the second skill, or vice versa. In an embodiment, the skills graph may be utilized to determine an implicit skill of a candidate based on an explicit skill of the candidate. For instance, if the candidate possesses a skill A, the candidate may also possess a skill B if the skill B is related to (or inherent to) the skill A.

A "skill proficiency score" refers to a score indicative of a degree of proficiency of a candidate on a particular skill. In an embodiment, the skill proficiency score of the candidate in a particular skill may be determined based on one or more scoping criteria associated with the one or more job opportunities.

"One or more scoping criteria" refer to a set of quantifiable parameters that may be used to determine the skill proficiency score of a candidate on a particular skill. Examples of the one or more scoping criteria include, but are not limited to, research publications, patents filed/granted, certifications, trainings, associations/affiliations, and endorsements.

A "skill recency score" refers to a score indicative of how recently a candidate brought to particular skill, possessed by the candidate, to use to perform a task. In an embodiment, the skill recency score for a particular skill of a candidate may be determined based on a chronology of usage of the particular skill by the candidate.

A "skill demand score" refers to a score that is indicative of a market demand associated with a particular skill of a candidate.

An "employability score" refers to a score that quantifies a capability of a candidate based on the candidate's proficiency on each skill in his/her skill set, how recently the candidate has used each skill in his/her skill set, and a market demand associated with each skill in his/her skill set.

FIG. 1 is a block diagram of a system environment 100, in which various embodiments may be implemented. The system environment 100 includes an application server 102, a database server 104, a candidate-computing device 106, a recruiter-computing device 108, and a network 110.

In an embodiment, the application server 102 refers to a computing device or a software framework hosting an application or a software service. In an embodiment, the application server 102 may be implemented to execute procedures such as, but not limited to, programs, routines, or scripts stored in one or more memories for supporting the hosted application or the software service. In an embodiment, the hosted application or the software service may be configured to perform one or more predetermined operations. In an embodiment, the application server 102 may be configured to automatically screen one or more candidates for one or more job opportunities. In an embodiment, the application server 102 may receive a respective job application from the candidate-computing device 106. In an embodiment, the application server 102 may group the one or more candidates into one or more batches based on a predetermined time duration, a count of candidates in the one or more candidates, and a chronology of reception of the job applications from the one or more candidates. In an embodiment, each of the one or more batches include a first set of candidates. From each batch, the application server 102 may identify a second set of candidates (e.g., a predetermined number of top candidates) based on a score assigned to each candidate in the first set of candidates. The selection of the candidates from the one or more batches has been described later in conjunction with FIG. 3. Further, the determination of the score has been described later in conjunction with FIG. 5.

The application server 102 may be realized through various types of application servers such as, but not limited to, a Java application server, a .NET framework application server, a Base4 application server, a PHP framework application server, or any other application server framework.

In an embodiment, the database server 104 may be configured to store the job applications received from the respective candidate-computing devices 106 of each of the one or more candidates. Further, in an embodiment, the database server 104 may store information pertaining to the one or more batches and the current position of the sliding window with respect to the one or more batches. In addition, in an embodiment, the database server 104 may store the skill graph and the skill requirement associated with the one or more job opportunities. In an embodiment, the database server 104 may receive a query from the application server 102 and/or the recruiter-computing device 108 to extract/store information from/to the database server 104. The database server 104 may be realized through various database technologies such as, but not limited to, Microsoft® SQL Server, Oracle®, IBM DB2®, Microsoft Access®, PostgreSQL®, MySQL® and SQLite®, and the like. In an embodiment, the application server 102 and the recruiter-computing device 108 may connect to the database server 104 using one or more protocols such as, but not limited to, Open Database Connectivity (ODBC) protocol and Java Database Connectivity (JDBC) protocol.

A person with ordinary skills in the art will understand that the scope of the disclosure is not limited to the database server 104 as a separate entity. In an embodiment, the functionalities of the database server 104 can be integrated into the application server 102.

In an embodiment, the candidate-computing device 106 refers to a computing device that includes one or more memories storing a computer program code that is executable by one or more processors of the candidate-computing device 106 to perform one or more predefined operations. In an embodiment, a candidate may use the candidate-computing device 106 to create his/her job application in the form of an electronic document. Thereafter, using the candidate-computing device 106, the candidate may apply for the one or more job opportunities by transmitting the electronic document associated with the job application of the candidate, to the application server 102 and/or the database server 104. In an embodiment, on the candidate-computing device 106, the candidate may receive a notification indicative of the candidate's selection or rejection for the one or more job opportunities from the application server 102 and/or the recruiter-computing device 108. In an embodiment, the candidate-computing device 106 may be realized through a variety of computing devices such as, but not limited to, a personal computer, a laptop, a personal digital assistant (PDA), a mobile device, a tablet, or any other computing device.

In an embodiment, the recruiter-computing device 108 refers to a computing device that includes one or more memories storing a computer program code that is executable by one or more processors of the candidate-computing device 106 to perform one or more predefined operations. In an embodiment, the recruiter-computing device 108 may be used by a recruiter/SME for screening the one or more candidates for the one or more job opportunities. Examples of the recruiter/SME include, but are not limited to, a human resource professional, a recruiting manager, a project manager, a team leader, or any other professional involved in hiring personnel for an organization. In an embodiment, through a user-interface of the recruiter-computing device 108, the recruiter/SME may receive a list of top ranked candidates (i.e., the second set of candidates) from each batch in the set of one or more batches. Using the recruiter-computing device 108, the recruiter/SME may modify a ranking of the candidates in the first set of candidates in each batch. Further, the recruiter/SME may remove a candidate from the second set of candidates using the recruiter-computing device 108. In an embodiment, the recruiter-computing device 108 may be realized through a variety of computing devices such as, but not limited to, a personal computer, a laptop, a personal digital assistant (PDA), a mobile device, a tablet, or any other computing device.

A person skilled in the art will understand that the scope of the disclosure is not limited to realizing the application server 102 and the recruiter-computing device 108 as separate entities. In an embodiment, the application server 102 may be realized as an application installed on/running on the recruiter-computing device 108 without departing from the scope of the disclosure.

The network 110 corresponds to a medium through which content and messages flow between various devices of the system environment 100 (e.g., the application server 102, the database server 104, the candidate-computing device 106, and the recruiter-computing device 108). Examples of the network 110 may include, but are not limited to, a Wireless Fidelity (Wi-Fi) network, a Wireless Area Network (WAN), a Local Area Network (LAN), or a Metropolitan Area Network (MAN). Various devices in the system environment 100 can connect to the network 110 in accordance with various wired and wireless communication protocols such as Transmission Control Protocol and Internet Protocol (TCP/IP), User Datagram Protocol (UDP), and 2G, 3G, or 4G communication protocols.

Figure 2:
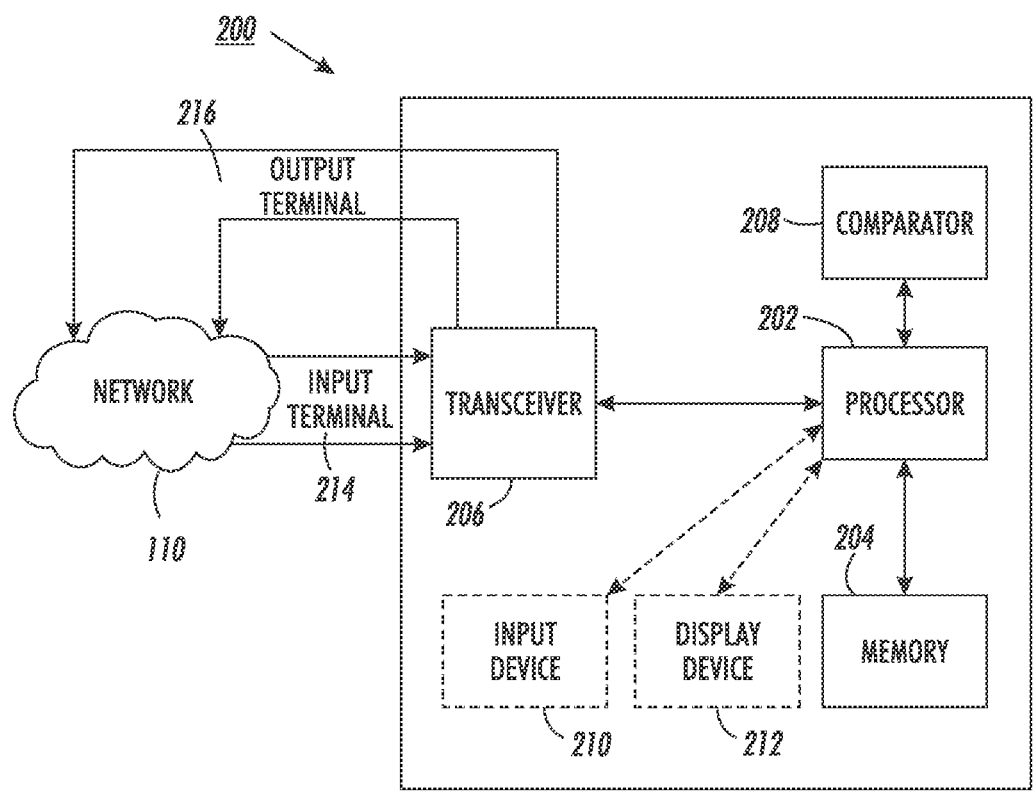
FIG. 2 is a block diagram that illustrates a system configured for screening one or more candidates for one or more job opportunities, in accordance with at least one embodiment.

FIG. 2 is a block diagram that illustrates a system 200 configured for screening the one or more candidates for the one or more job opportunities, in accordance with at least one embodiment. In an embodiment, the system 200 may correspond to the application server 102 or the recruiter-computing device 108. For the purpose of ongoing description, the system 200 is considered the application server 102. However, the scope of the disclosure should not be limited to the system 200 as the application server 102. The system 200 may also be realized as the recruiter-computing device 108, without departing from the spirit of the disclosure.

The system 200 includes a processor 202, a memory 204, a transceiver 206, a comparator 208, an input device 210, a display device 212, an input terminal 214, and an output terminal 216. The processor 202 is coupled to the memory 204, the transceiver 206, the comparator 208, the input device 210, and the display device 212. The transceiver 206 is connected to the network 110 through the input terminal 214 and the output terminal 216.

The processor 202 includes suitable logic, circuitry, and/or interfaces that are operable to execute one or more instructions stored in the memory 204 to perform predetermined operations. The processor 202 may be implemented using one or more processor technologies known in the art. Examples of the processor 202 include, but are not limited to, an x86 processor, an ARM processor, a Reduced Instruction Set Computing (RISC) processor, an Application-Specific Integrated Circuit (ASIC) processor, a Complex Instruction Set Computing (CISC) processor, or any other processor.

The memory 204 stores a set of instructions and data. Some of the commonly known memory implementations include, but are not limited to, a random access memory (RAM), a read only memory (ROM), a hard disk drive (HDD), and a secure digital (SD) card. Further, the memory 204 includes the one or more instructions that are executable by the processor 202 to perform specific operations. It is apparent to a person with ordinary skills in the art that the one or more instructions stored in the memory 204 enable the hardware of the system 200 to perform the predetermined operations.

The transceiver 206 receives and transmits messages and data from/to various components of the system environment 100 (e.g., the database server 104, the candidate-computing device 106, and the recruiter-computing device 108) over the network 110 through the input terminal 214 and the output terminal 216. Examples of the transceiver 206 may include, but are not limited to, an antenna, an Ethernet port, a USB port, or any other port that can be configured to receive and transmit data. The transceiver 206 receives and transmits data/messages in accordance with the various communication protocols, such as, TCP/IP, UDP, and 2G, 3G, or 4G communication protocols through the input terminal 214 and the output terminal 216, respectively.

The comparator 208 is configured to compare at least two input signals to generate an output signal. In an embodiment, the output signal may correspond to either "1" or "0". In an embodiment, the comparator 208 may generate output "1" if the value of a first signal (from the at least two signals) is greater than the value of a second signal (from the at least two signals). Similarly, the comparator 208 may generate an output "0" if the value of the first signal is less than the value of the second signal. In an embodiment, the comparator 208 may be realized through either software technologies or hardware technologies known in the art. Though, the comparator 208 is depicted as independent from the processor 202 in FIG. 2, a person skilled in the art will appreciate that the comparator 208 may be implemented within the processor 202 without departing from the scope of the disclosure.

The input device 210 may comprise suitable logic, circuitry, interfaces, and/or code that may be operable to receive an input from the user. The input device 210 may be operable to communicate with the processor 202. Examples of the input devices may include, but are not limited to, a touch screen, a keyboard, a mouse, a joystick, a microphone, a camera, a motion sensor, a light sensor, and/or a docking station.

The display device 212 may comprise suitable logic, circuitry, interfaces, and/or code that may be operable to render a display. In an embodiment, the display device 212 may be realized through several known technologies such as, Cathode Ray Tube (CRT) based display, Liquid Crystal Display (LCD), Light Emitting Diode (LED) based display, Organic LED display technology, and Retina display technology. In addition, in an embodiment, the display device 212 may be capable of receiving input from a user. In such a scenario, the display device 212 may be a touch screen that enables the user to provide input. In an embodiment, the touch screen may correspond to at least one of a resistive touch screen, capacitive touch screen, or a thermal touch screen. In an embodiment, the display device 212 may receive input through a virtual keypad, a stylus, a gesture, and/or touch based input.

Figure 3:
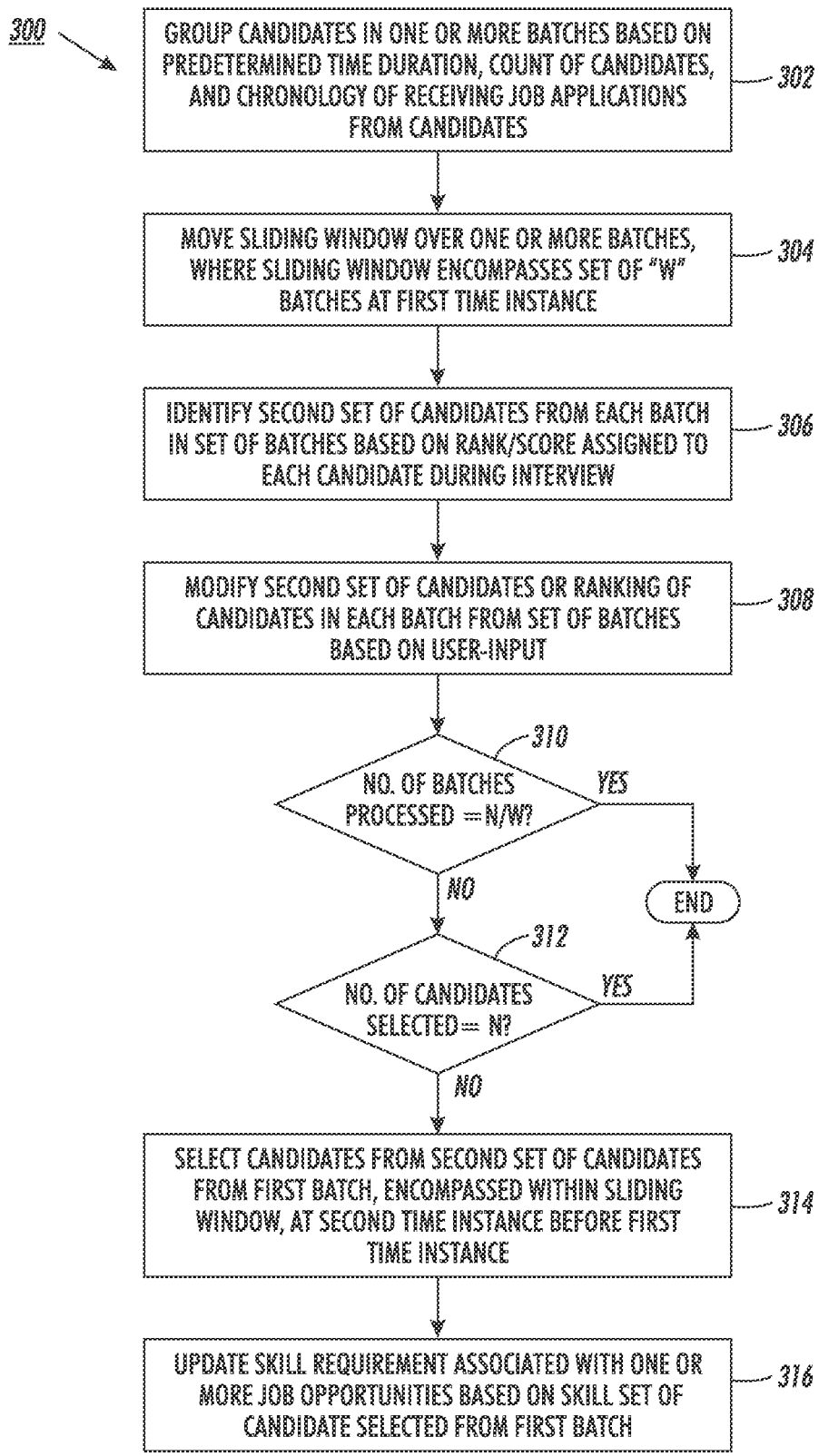
FIG. 3 illustrates a flowchart of a method for screening one or more candidates for one or more job opportunities, in accordance with at least one embodiment.

An embodiment of the operation of the system 200 for screening the one or more candidates for the one or more job opportunities has been explained further in conjunction with FIG. 3.

FIG. 3 illustrates a flowchart 300 of a method for screening the one or more candidates for the one or more job opportunities, in accordance with at least one embodiment. The flowchart 300 is described in conjunction with FIG. 1, FIG. 2, FIG. 4A, FIG. 4B, and FIG. 4C.

At step 302, the one or more candidates are grouped into the one or more batches. In an embodiment, the processor 202 is configured to group the one or more candidates into the one or more batches. In an embodiment, the grouping of the one or more candidates into the one or more batches may be based on a predetermined time duration. In an embodiment, the recruiter/SME may provide an input indicative of the predetermined time duration. For instance, the predetermine time duration is a week. In such a scenario, the processor 202 may create a batch-1 with candidates whose job applications are received in a week-1. Further, the processor 202 may create a batch-2 with candidates whose job applications are received in a subsequent week-2, and so on. Further, the creation of the one or more batches may also be based on the chronology of receiving the job applications of the one or more candidates. For instance, in the above example, the job applications of the candidates grouped in the batch-1 are received in the week-1, while the job applications of the candidates grouped in the batch-2 are received in the week-2, which is subsequent to the week-1. Therefore, the batch-1 may be chronologically older than the batch-2.

In addition, in an embodiment, the processor 202 may create the one or more batches based on the count of the one or more candidates, such that each batch includes at most a predetermined number of candidates from the one or more candidates. In an embodiment, the recruiter/SME may provide an input indicative of the predetermined number. For example, the predetermined number of candidates is 50 and the count of the one or more candidates is 520. In such a scenario, the processor 202 may group the one or more candidates into the one or more batches in such a manner that each batch includes at most 50 candidates. Thus, the processor 202 may create 11 batches, 10 of which may include 50 candidates, and the 11th batch may include the remaining 20 candidates.

A person skilled in the art will understand that the processor 202 may group the one or more candidates into the one or more batches using a combination of the aforementioned techniques. For instance, the processor 202 may identify candidates whose job applications are received within the predetermined time duration, for example, a week. Thereafter, the processor 202 may create a batch for a given week and group the candidates, whose job applications are received during the particular week, into the created batch. In an embodiment, the processor 202 may create multiple batches for the particular week based on a count of the candidates whose job applications are received during the given week, the chronology of receiving the job applications, and the predetermined number of candidates to be grouped in each batch. For instance, the predetermined number of candidates is 50, and the count of candidates whose job applications are received during the given week is 210. In such a scenario, the processor 202 may create five batches in chronology of reception of job applications of the candidates. Further, four out of the five batches may include 50 candidates, while the $5^{th}$ group may include the remaining 10 candidates.

A person skilled in the art will understand that the processor 202 may perform the step 302 in real-time such that batches of candidates are created as job applications of candidates are received in real-time from the candidate-computing device 108 of the respective candidates. Further, the processor 202 may continue performing the step 302 until one or more termination conditions are satisfied. Examples of the one or more termination conditions include, but are not limited to, a count of job applications received exceeding a first threshold, a count of batches created exceeding a second threshold, or a count of candidates selected exceeding a third threshold. In an embodiment, the SME/recruiter may provide values of the first threshold, the second threshold, and the third threshold. Alternatively, the processor 202 may repeat the step 302 at the end of the each predetermined time duration.

In an embodiment, the processor 202 may store information pertaining to the one or more batches of candidates in the memory 204, such that the one or more batches are arranged chronologically in the memory 204. In an embodiment, a linked list data structure may be used to store the chronologically arranged batches in the memory 204. However, a person skilled in the art will understand that any other data structure may also be used for storing the one or more batches in the memory 204.

In an embodiment, let each of the one or more batches include a set of candidates. In an embodiment, the processor 202 may perform a preliminary screening of the job application of each candidate in the set of candidates. Based on the preliminary screening of the each candidate in the set of candidates, the processor 202 may select a first set of candidates. In an embodiment, the processor 202 may determine an employability score for each candidate in the set of candidates based on the screening of the job application. In an embodiment, the employability score may correspond to a score that quantifies a capability of a candidate based on the candidate's proficiency on each skill in his/her skill set, how recently the candidate used each skill in his/her skill set, and a market demand associated with each skill in his/her skill set. In an embodiment, the determination of the employability score has been further explained in conjunction with FIG. 5.

In an embodiment, the processor 202 may filter the first set of candidates from the set of candidates based on the employability score of the candidates and a minimum employability score threshold (which may be provided by the recruiter/SME). For instance, if the employability score of a candidate is greater than the minimum employability score threshold, the processor 202 may transmit an indication to the recruiter-computing device 108. In an embodiment, the indication may correspond to whether the interview of a candidate in the set of candidates needs to be conducted.

At step 304, the sliding window is moved over the one or more batches. In an embodiment, the processor 202 is configured to define the sliding window as a virtual window, which may move over the one or more batches, and may encompass a set of batches from the one or more batches at a first time instance. In an embodiment, the sliding window may encompass a predetermined number of batches at any given time instance. In an embodiment, the set of batches encompassed within the sliding window may be arranged in a chronological sequence of creation of the respective batches. In an embodiment, the movement of the sliding window may be dependent on creation of a new batch. In an embodiment, when a new batch of candidates is created, the sliding window may move by one batch such that the chronologically oldest batch is deleted from the sliding window, while the chronologically next batch from the one or more batches (e.g., the newly created batch), may be added to the sliding window. An example of the sliding window is explained in conjunction with FIGS. 4A-4C.

Figure 4A:
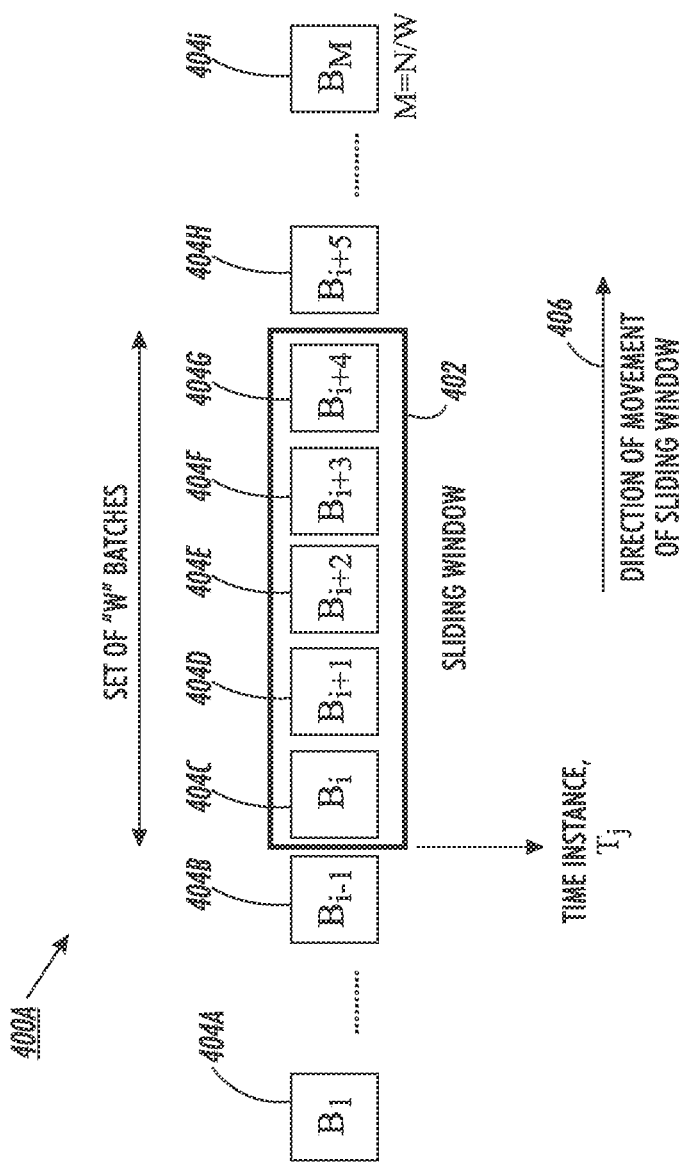
FIGS. 4A-4C illustrate examples of a sliding window that moves over one or more batches of candidates, in accordance with at least one embodiment.
Figure 4B:
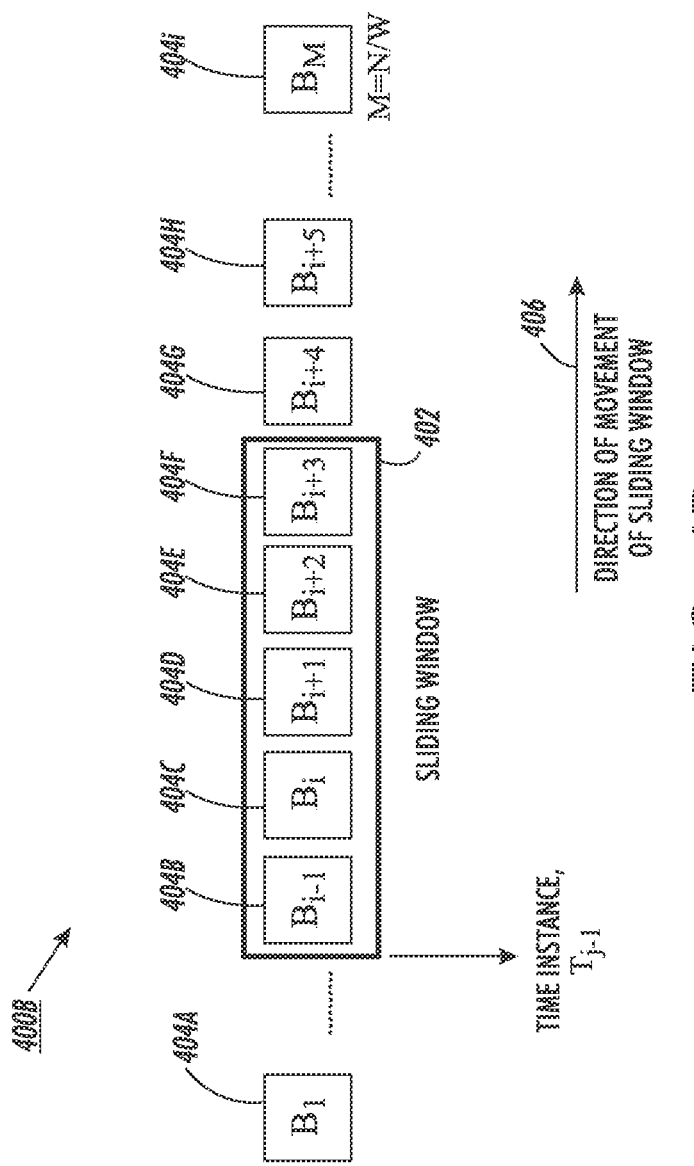
Figure 4C:
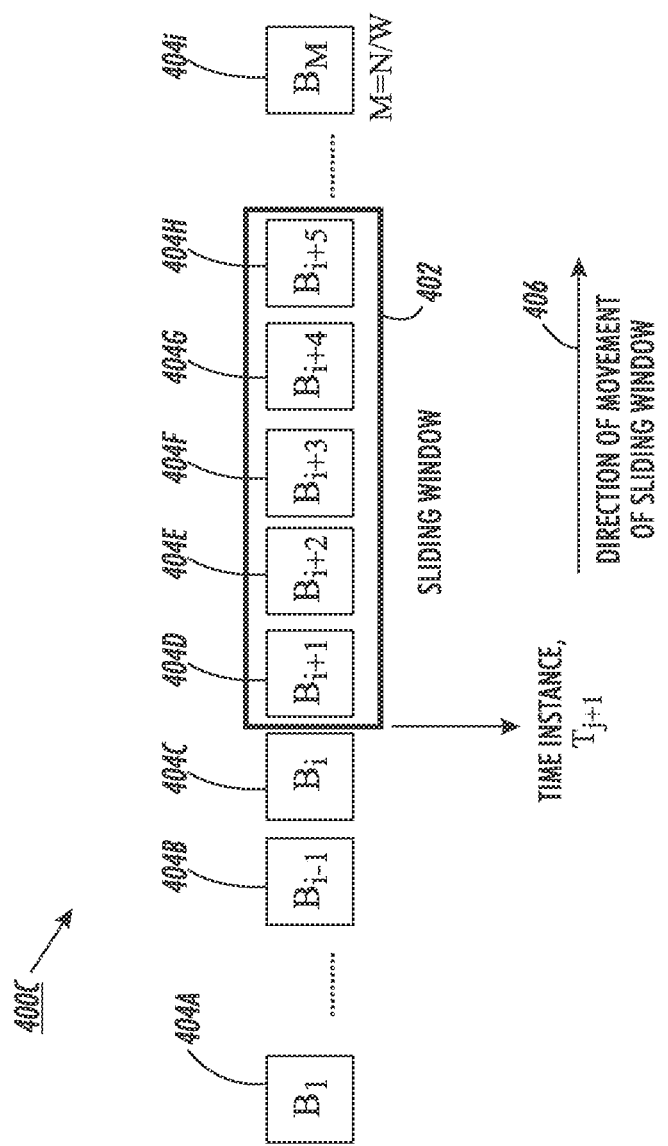

FIGS. 4A-4C illustrate examples of the sliding window (depicted by 402) that moves over the one or more batches of candidates (referred collectively by 404), in accordance with at least one embodiment.

FIG. 4A depicts the sliding window 402 at a first time instance $T_j$. In an embodiment, the processor 202 may define the sliding window 402 to be movable over the one or more batches 404 such that at any given time instance, the sliding window 402 encompasses a predetermined number of batches (e.g., a set of "w" batches) from the one or more batches 404. Further, in an embodiment, the one or more batches 404 may be arranged chronologically with respect to a time of receipt of job applications of candidates within the respective one or more batches 404. Therefore, if the predetermined number of batches is 5, the sliding window 402 may encompass 5 chronologically subsequent batches from the one or more batches 404. Further, the processor 202 may be configured to move the sliding window over the one or more batches 404, as time elapses and a new batch of candidates is created (refer to step 302).

For example, as shown in FIG. 4A, the one or more batches 404 include M batches such as batches $B_1$ (depicted by 404a), ..., $B_{i-1}$ (depicted by 404b), $B_i$ (depicted by 404c), $B_{i+1}$ (depicted by 404d), $B_{i+2}$ (depicted by 404e), $B_{i+3}$ (depicted by 404f), $B_{i+4}$ (depicted by 404g), $B_{i+5}$ (depicted by 404h), ..., and $B_M$ (depicted by 404i). At the first time instance $T_j$, the sliding window 402 may include five batches such as the batches $B_i$ (depicted by 404c), $B_{i+1}$ (depicted by 404d), $B_{i+2}$ (depicted by 404e), $B_{i+3}$ (depicted by 404f), and $B_{i+4}$ (depicted by 404g). As shown in FIG. 4A, the sliding window 402 may move over the one or more batches 404 in the direction 406 (e.g., in a left-to-right direction), when time elapses and a batch of candidates is created (refer to step 302).

FIG. 4B depicts the sliding window 402 at a second time instance, $T_{j-1}$ preceding the first time instance $T_j$. As shown in FIG. 4B, the sliding window 402 may include the batches $B_{i-1}$ (depicted by 404b), $B_i$ (depicted by 404c), $B_{i+1}$ (depicted by 404d), $B_{i+2}$ (depicted by 404e), and $B_{i+3}$ (depicted by 404f). As the sliding window 402 moves over the one or more chronologically arranged batches 404 in the direction 406 (e.g., in a left-to-right direction) at the first time instance $T_j$, the batch $B_{i-1}$ (depicted by 404b) may be deleted from the sliding window 402, while the batch $B_{i+4}$ (depicted by 404h) may be added to the sliding window 402.

FIG. 4C depicts the sliding window 402 at a third time instance, $T_{j+1}$, succeeding the first time instance $T_j$. As shown in FIG. 4C, at the third time instance $T_{j+1}$, the sliding window 402 may move over the one or more batches 402 in the direction 406 such that the sliding window 402 now encompasses the batches $B_{i+1}$ (depicted by 404d), $B_{i+2}$ (depicted by 404e), $B_{i+3}$ (depicted by 404f), $B_{i+3}$ (depicted by 404g), and $B_{i+5}$ (depicted by 404h). Hence, at the time instance $T_{j+1}$, the batch $B_i$ (depicted by 404c) is removed from the sliding window 402, while the batch $B_{i+5}$ (depicted by 404h) is added to the sliding window 402.

Therefore, in an embodiment, on creation of each new batch, the sliding window 402 may move over the one or more batches 404 in the direction 406, such that the chronologically oldest batch is deleted from sliding window 402, while the newly created batch is added to the sliding window 402, and so on.

A person skilled in the art will understand that the sliding window 402 may have a predefined length "w", which may depend on the predetermined number of batches that may be encompassed with the sliding window 402. In an embodiment, the predefined length of the sliding window 402 may correspond to a time interval. For example, the predefined length of the sliding window is four weeks. In such a scenario, the sliding widow may encompass four batches that were created in these four weeks. In an embodiment, the time interval may be "w" times the predetermined time duration required for creation of each batch, where "w" corresponds to the predetermined number of batches encompassed within the sliding window 402 at any given time instance. For instance, as shown in FIGS. 4A-4C, the sliding window 402 may include five batches (i.e., here, w=5) at any time instance (such as time instances $T_{j-1}$, $T_j$, and $T_j$). If the predetermined time duration associated with the creation of each batch is one week, the predefined length of the sliding window 402 may correspond to five weeks. Thus, any batch may remain within the sliding window 402 for up to five weeks. In an embodiment, the recruiter/SME, through the user-interface of the recruiter-computing device 108, may specify the predefined length of the sliding window 402. In an embodiment, the recruiter/SME may modify the predefined length of the sliding window 402 based on number of candidates selected, number of batches processed, or both. Alternatively, the processor 202 may modify the predefined length of the sliding window 402 based on one or more configurable rules defined by the recruiter/SME.

In addition, a person having ordinary skill in the art will understand that the scope of the disclosure should not be limited to moving the sliding window 402 over the one or more batches 404, one batch at a time, as each new batch is created. In an embodiment, the sliding window 402 may move over the one or more batches 404 after a certain "x" number of new batches (x<=w, where w refers to the predetermined length of the sliding window 402) are created. In such a scenario, the sliding window 402 may not move immediately as each new batch is created. Instead, the sliding window 402 may move over the one or more batches 404, by "x" batches, once all the new "x" batches are created. In an embodiment, the number "x" may be specified by the recruiter/SME.

Referring back to FIG. 3, at step 306, a second set of candidates is identified from the first set of candidates in each batch in the set of batches. In an embodiment, the processor 202 is configured to identify the second set of candidates from the first set of candidates from each batch in the set of batches within the sliding window. In an embodiment, the second set of batches may correspond to top ranked candidates in the first set of batches. In an embodiment, the processor 202 may identify the second set of candidates based at least on a score assigned to each candidate in first set of candidates during an interview with the candidate. In an embodiment, the interview-based score assigned to a candidate may be indicative of a suitability of the candidate for a job opportunity from the one or more job opportunities. Further, in an embodiment, the score may indicate whether the candidate possesses a skill required for the job opportunity. For instance, the recruiter may conduct one or more interview rounds with each candidate. Thereafter, the recruiter may assign the score to the candidate interviewed based on a performance of the candidate during the one or more interview rounds. Further, using the recruiter-computing device 108, the recruiter may transmit the score assigned to the candidate to the processor 202.

For example, the interview-based score may be represented as a vector, say a candidate skills (CS) vector={S1, S2, . . . , Sp}, where the each individual element S1, S2, . . . , Sp of the CS vector may be a binary value indicative of whether the candidate possesses a given skill or not. For instance, the element S1 may indicate whether the candidate knows how to program in C language. Further, the element S2 may indicate whether the candidate possess skills of programming in Java language, and so on. Thus, for a given candidate, the element S1 may be assigned a value of "1" if the candidate knows programming in C. Further, the element S2 may be assigned a value of "0" if the given candidate does not possess skills of programming in Java language, and so on. A person skilled in the art will appreciate that the scope of the disclosure should not be limited to the elements of the CS vector (e.g., S1, S2, . . . , Sp) being assigned binary values. In an embodiment, the elements of the CS (e.g., S1, S2, . . . , Sp) may be assigned values ranging between 0 and 1, where a value of 0 may be indicative of a candidate not possessing a particular skill, a value of 1 may be indicative of a candidate having a strong grasp of the particular skill, while intermediate values may be indicative of an intermediate level of proficiency of the candidate on the particular skill.

A person skilled in the art will understand that the scope of the disclosure should not be limited to the assigning the interview-based score to the candidate based on the candidate's performance during one or more interview rounds. Further, the scope of the disclosure should not be limited to a manual scoring of the candidate by the recruiter. In an embodiment, the processor 202 may automatically assign the score to the candidate based on the candidate's performance on one or more online tests conducted to evaluate the candidate's skills, aptitude, and/or knowledge.

In addition, in an embodiment, identification of the second set of candidates from the first set of batches may also be based on the skill requirement associated with the one or more job opportunities and a hiring cost associated with each candidate in the first set of candidates.

For example, the skill requirement associated with the one or more job opportunities may be also be represented by a vector, say a required skills (RS) vector={R1, R2, ..., Rq} (where, q>=p), where each individual element R1, R2, ..., Rq of the RS vector may be indicative of a weight associated with a respective skill required for the one or more job opportunities. In an embodiment, the weight associated with a given skill is determined based on a number of candidates required with the given skill for the one or more job opportunities. For instance, the element R1 in the RS vector may represent the skill "knowledge of programming in C language" in the RS vector. If the one or more job opportunities require 12 candidates having knowledge of programming in C language, the element R1 in the RS vector may have an initial value of 12, and so on. In another embodiment, the weight associated with a given skill may be determined based on one or more expected projects/tasks to be performed by the organization. For example, the weights associated with each skill may be determined based on upcoming projects that are expected to be performed by the organization within the next six months, and so on. Alternatively, the weight associated with a given skill may be determined based on industry trends of similar organizations or similar job profiles.

To identify the second set of candidates from the first set of candidates in each batch, for each candidate $C_i$ in the first set of candidates, the processor 202 may perform a dot product on the CS vectors of the respective candidates and the RS vector. Based on the dot product, the processor 202 may determine a quality score (QS) for each candidate $C_i$, as represented in the equation below:

$$QS_i = CS_i \cdot RS \qquad (1)$$

where, $QS_i$: quality score (QS) of the candidate $C_i$ from the first set of candidates;

$CS_i$: CS vector of the candidate $C_i$ (determined based on the interview-based score assigned to the candidate $C_i$); and RS: RS vector determined based on the skill requirement associated with the one or more job opportunities.

Thereafter, the processor 202 may determine the hiring cost (HC) associated with each candidate $C_i$ in the first set of candidates. In an embodiment, the processor 202 may receive a salary expectation associated with the candidate $C_i$ from the recruiter-computing device 108. For instance, during the one or more interview rounds of the candidate $C_i$, the candidate $C_i$ may provide the recruiter with his/her salary expectation. The recruiter may use the recruiter-computing device 108 to transmit the salary expectation of the candidate $C_i$ to the processor 202. Based on the salary expectation of the candidate $C_i$, the processor 202 may determine an estimate of the hiring cost HC of the candidate $C_i$ using one or more financial/cost accounting provisions such as, but not limited to, a tax liability associated with hiring the candidate $C_i$, a social security liability associated with hiring the candidate $C_i$, a joining bonus payable to the candidate $C_i$, an overhead cost associated with hiring the candidate $C_i$, or any other cost associated with hiring the candidate $C_i$.

After determining the hiring cost HC associated with each candidate $C_i$, the processor 202 may determine a quality-to-cost ratio (Q/C ratio) for the candidate $C_i$ using the following equation:

$$\left(\frac{Q}{C}\right)_i = \frac{QS_i}{HC_i} \qquad (2)$$

where, $(Q/C)_i$: Q/C ratio of the candidate $C_i$ from the first set of candidates;

$QS_i$: the quality score (QS) of the candidate $C_i$ from the first set of candidates; and $HC_i$: the hiring cost (HC) of the candidate $C_i$ from the first set of candidates.

After determining the Q/C ratio for each candidate in the first set of candidates (in each batch from the set of batches in the sliding window), in an embodiment, the processor 202 may rank each candidate $C_i$ in the first set of candidates with respect to the other candidates in the first set of candidates based on the Q/C ratios of the candidates. Thus, the processor 202 may perform the ranking of the candidates in each batch with respect to the other candidates in the same batch based on the Q/C ratios of the candidates. Alternatively (or additionally), the processor 202 may rank each candidate $C_i$ in the first set of candidates based on the interview-based score assigned to each candidate $C_i$.

A person skilled in the art will understand that the ranking of the first set of candidates may be performed based on the employability score, in addition to, or instead of, performing the ranking based on the Q/C ratio, as discussed above, without departing from the scope of the disclosure.

Further, a person skilled in the art will understand that the scope of the disclosure should not be limited to performing the filtering of the first set of candidates based on the employability score. In an embodiment, the filtering of the candidates from the first set of candidates may be performed based on the Q/C ratios of the candidates. In such a scenario, the ranking of the candidates may be performed based on the employability score.

Based on the ranking of the candidates in the first set of candidates (i.e., the candidates grouped into a batch from the set of batches), the processor 202 may identify the second set of candidates from the first set of candidates. For instance, the processor 202 may identify a predefined percentage/number of top ranking candidates from the first set of candidates in a batch as the second set of candidates of that batch. In an embodiment, the processor 202 may identify top "w" candidates from the first set of candidates as the second set of candidates. In other words, the processor 202 may identify a total of $w^2$ candidates in the sliding window by identifying the top "w" candidates from each batch in the set of batches in the sliding window.

At step 308, the selection of the second set of candidates is modified based on an input from the recruiter. In an embodiment, the processor 202 is configured to modify the second set of candidates based on a user-input received from the recruiter-computing device 108. For instance, on a user-interface of the recruiter-computing device 108, the processor 202 may present a ranked list of candidates in the first set of candidates from a batch of candidates to the recruiter. Through the user-interface of the recruiter-computing device 108, the recruiter may view the ranking of the first set of candidates and provide an input to change the ranking of a candidate in the first set of candidates based on the recruiter's preference. For instance, if the recruiter considers that a first candidate is better than one or more second candidates, who are ranked higher than the first candidate in the first set of candidates, the recruiter may provide an input for assigning a higher rank to the first candidate than the ranks assigned to the one or more second candidates.

Similarly, through the user-interface of the recruiter-computing device 108, the processor 202 may present the second set of candidates identified from the first set of candidates (in each batch in the set of batches in the sliding window) to the recruiter. Through the user-interface of the recruiter-computing device 108, the recruiter may view the second set of candidates and provide an input for removing a candidate from the second set of candidates based on the recruiter's preference. For instance, if the recruiter considers that a particular candidate in the second set of candidates is not suitable for the one or more job opportunities, the recruiter may provide an input for removing the particular candidate from the second set of candidates.

At step 310, a check is performed to determine whether the number of batches processed is equal to the second threshold. In an embodiment, the processor 202 is configured to perform the check using the comparator 208. In an embodiment, the second threshold may be represented as a ratio of total number of candidates to be selected (represented as n) to the predetermined number of batches encompassed within the sliding window at any given instance (represented as w), i.e., the second threshold=n/w. In an embodiment, the processor 202 may consider a batch as processed when the second set of candidates identified from the first set of candidates in the batch have been selected, as described in conjunction with step 314. If the processor 202 determines that the number of batches processed is less than the second threshold, the processor 202 performs the step 312. Otherwise, the procedure of the flowchart 300 terminates, as the process of screening of the one or more candidates may be complete and the required number of candidates may have been selected.

At step 312, a check is performed to determine whether the number of candidates selected is equal to the third threshold. In an embodiment, the processor 202 is configured to perform the check using the comparator 208. In an embodiment, the third threshold may correspond to the total number of candidates to be selected (represented as n). If the processor 202 determines that the number of candidates selected is less than the third threshold, the processor 202 performs the step 314. Otherwise, the procedure of the flowchart 300 terminates, as the process of screening of the one or more candidates may be complete and the required number of candidates may have been selected.

A person skilled in the art will understand that the steps 310 and 312 may be performed in any order without departing from the scope of the disclosure. Further, in an embodiment, the processor 202 may also determine whether the number of job applications received, exceed the first threshold (which may be provided by the recruiter). If the number of job applications received is less than the first threshold, the processor 202 may perform the step 314. Otherwise, the procedure of the flowchart 300 may terminate, even if the required number of candidates may not have been selected. Thus, the procedure of the flowchart 300 may terminate if the number of candidates screened exceeds the first threshold. If the recruiter desires, the recruiter may increase the first threshold so that the screening of the candidates, according to the procedure of the flowchart 300, may continue.

At step 314, candidates from the second set of candidates from a first batch are reselected. In an embodiment, the processor 202 is configured to select the candidates from the second set of candidates identified from the first batch. In an embodiment, the first batch may correspond to a batch that is encompassed within the sliding window at the second time instance before the first time instance. The selection of the candidates from the second set of candidates in the first batch has been explained in conjunction with FIGS. 4A-4C.

As shown in FIG. 4B, at the second time instance $T_{j-1}$, the sliding window 402 includes the batches $B_{i-1}$ (depicted by 404b), $B_i$ (depicted by 404c), $B_{i+1}$ (depicted by 404d), $B_{i+2}$ (depicted by 404e), and $B_{i+3}$ (depicted by 404f). As the sliding window 402 moves over the one or more batches 404 in the direction 406, at the first time instance $T_j$, succeeding the second time instance $T_{j-1}$, the first batch, for example, the batch $B_{i-1}$ (depicted by 404b) may be deleted from the sliding window 402. Further, the batch $B_{i+4}$ (depicted by 402g) may be added to the sliding window 402, as shown in FIG. 4A. Thus, at the first time instance $T_j$, the processor 202 may select candidates in the second set of candidates from the first batch, for example, the batch $B_{i-1}$ (depicted by 404b).

Similarly, as shown in FIG. 4C, when the sliding window 402 moves over the one or more batches 404 in the direction 406, at the third time instance $T_{j+1}$, succeeding the first time instance $T_j$, the next first batch, for example, the batch $B_i$ (depicted by 404c) may be deleted from the sliding window 402. Further, the batch $B_{i+5}$ (depicted by 404h) may be added to the sliding window 402, as shown in FIG. 4C. Thus, at the third time instance $T_{j+1}$, the processor 202 may select candidates in the second set of candidates from the next first batch, for example, the batch $B_i$ (depicted by 404c), and so on.

As discussed, the sliding window 402 may have a predefined length, which may correspond to the time interval until when a batch may remain within the sliding window 402. For instance, as shown in FIG. 4C, at the time instance $T_{j+1}$, the sliding window 402 includes five batches (i.e., w=5) such as $B_{i+1}$ (depicted by 404d), $B_{i+2}$ (depicted by 404e), $B_{i+3}$ (depicted by 404f), $B_{i+4}$ (depicted by 404g), and $B_{i+5}$ (depicted by 404h). Once the predetermined time duration (e.g., one week) after the time instance $T_{j+1}$ elapses (e.g., at a time instance $T_{j+2}$), a new batch, for example, $B_{i+6}$ (not shown in FIG. 4C), may be created. At this stage, the batch $B_{i+1}$ (depicted by 404d) may be deleted from the sliding window 402, while the new batch $B_{i+6}$ may be added to the sliding window 402. On creation of each subsequent new batch, the sliding window 402 may move in the direction 406 (i.e., the sliding window 402 may move rightwards) and the batch $B_{i+6}$ may be left-shifted by one location within the sliding window 402. As is evident, after being left-shifted five times, the batch $B_{i+6}$ may be deleted from the sliding window 402. Further, when the batch $B_{i+6}$ is deleted from the sliding window 402, the second set of candidates (i.e., the top "w" ranked candidates) in the batch $B_{i+6}$ may be selected. Hence, in the current scenario, each batch may remain in the sliding window 402 for a time interval equal to five weeks (i.e., 5 times one week) as the sliding window 402 encompasses five batches and the predetermined time duration required for forming a batch is one week.

In an alternate embodiment, the processor 202 may segregate each batch of candidates, from the one or more batches 404, into one or more sub-batches based on individual skills of candidates who are grouped in the respective batches. In an embodiment, based on such segregation, a candidate may be segregated into multiple sub-batches if the candidate possesses multiple skills. For instance, the processor 202 may create four sub-batches, such as SB-1, SB-2, SB-3, and SB-4 for segregating candidates possessing skills Java, C++, Android, and Python, respectively. If a candidate possesses the skills Java and C++, the candidate may be segregated into the sub-batches SB-1 and SB-2, while if the candidate knows only Python, the candidate may be segregated into the sub-batch SB-4 only, and so on. In an embodiment, the processor 202 may maintain multiple sliding windows, one for each skill. Thus, each sliding window, associated with a particular skill, may encompass a set of predetermined number of sub-batches. Each such sub-batch may include candidates possessing the particular skill. Further, the processor 202 may move each sliding window over the respective set of sub-batches, as new sub-batches associated with the respective skill are created.

At step 316, the skill requirement associated with the one or more job opportunities is updated. In an embodiment, the processor 202 is configured to update the skill requirement associated with the one or more job opportunities based on the skill set of the candidates selected from the second set of candidates from the first batch. In an embodiment, the processor 202 may update the skill requirement by updating the RS vector using the following equation:

$$R_k^{t+1} = R_k^t * (1 - \in)^{\Sigma_{i=1}^{r}(S_k)_i} \qquad (3)$$

where, $R_k^t$: an element of the RS vector, representing a weight of a skill "k" for the one or more job opportunities, at a time instance t (e.g., the second time instance, $T_{j-1}$);

$R_k^{t+1}$: an element of the RS vector, representing an updated weight of the skill "k" for the one or more job opportunities, at a time instance t+1 (e.g., the first time instance, $T_j$);

$(S_k)_i$: an element of the CS vector for a candidate $C_i$, representing whether the candidate $C_i$ possess the skill "k", where the candidate $C_i$ is a selected candidate belonging to the second set of candidates from the first batch;

$\in$: a tunable constant, ranging from 0 to 1 (may be provided by the recruiter); and r: a number of selected candidates from the second set of candidates from the first batch.

For example, the second set of candidates includes three selected candidates $C_1$, $C_2$, and $C_3$. The candidates $C_1$ and $C_2$ possess a skill "k", while the candidate $C_3$ does not possess the skill "k". Thus, $(S_k)_1=1$, $(S_k)_2=1$, and $(S_k)_3=0$. If the weight of the skill k at the time instance t, i.e., $R_k^t=3$ and $\in=0.25$, the updated weight of the skill k at the time instance t+1 may be 1.6875 (i.e., $3*(1-0.25)^{1+1+0}=3*(0.75)^2$).

A person skilled in the art will understand that if a selected candidate $C_i$ possesses a skill "k", $(S_k)_i$ may be greater than 0. Hence, in such a scenario, $R_k^{t+1}$ may become less than $R_k^t$, which may be indicative of a reduction of a skill gap pertaining to the skill "k". Thus, now, a lesser number of candidates, who possess the skill "k", may be required for the one or more job opportunities. On the contrary, if each selected candidate does not possess the skill k, $R_k^{t+1}$ may remain same as $R_k^t$, which may be indicative of an unchanged skill gap with respect to the skill "k". Thus, in this scenario, the requirement of candidates with the skill "k" for the one or more job opportunities may remain unchanged.

As discussed in supra (refer to the step 302), the grouping of the candidates in the one or more batches may continue in real-time. Thus, after updating the skill requirement, the processor 202 may continue grouping of the one or more candidates (in a manner similar to that discussed in the step 302) as the job applications of the candidates are received from the respective candidate-computing device 106 of the candidates. Thereafter, the processor 202 may perform the steps 304 through 316, in a manner similar to that discussed above until the one or more termination conditions are satisfied. Examples of the one or more termination conditions include, but are not limited to, the count of job applications received exceeding the first threshold, the count of batches created exceeding the second threshold, or the count of candidates selected exceeding a third threshold. In an embodiment, the SME/recruiter may provide values of the first threshold, the second threshold, and the third threshold.

A person skilled in the art will understand that the procedure of screening of the one or more candidates for the one or more job opportunities, as discussed in the flowchart 300, may continue even after a required number of job applications are received (as specified by the first threshold), a required number of batches are processed (as specified by the second threshold), and/or a required number of candidates are selected (as specified in the third threshold). In such a scenario, the number of selected candidates may become more than the number of job opportunities. Thus, in a scenario where a candidate selected does not join the organization, the organization may hire another similar candidate from the pool of selected candidates. Alternatively, the organization may hire more than the required number of candidates to form a pool of reserve workforce in the organization. Candidates in the reserve workforce may be placed on upcoming job opportunities or projects within the organization.

Figure 5:
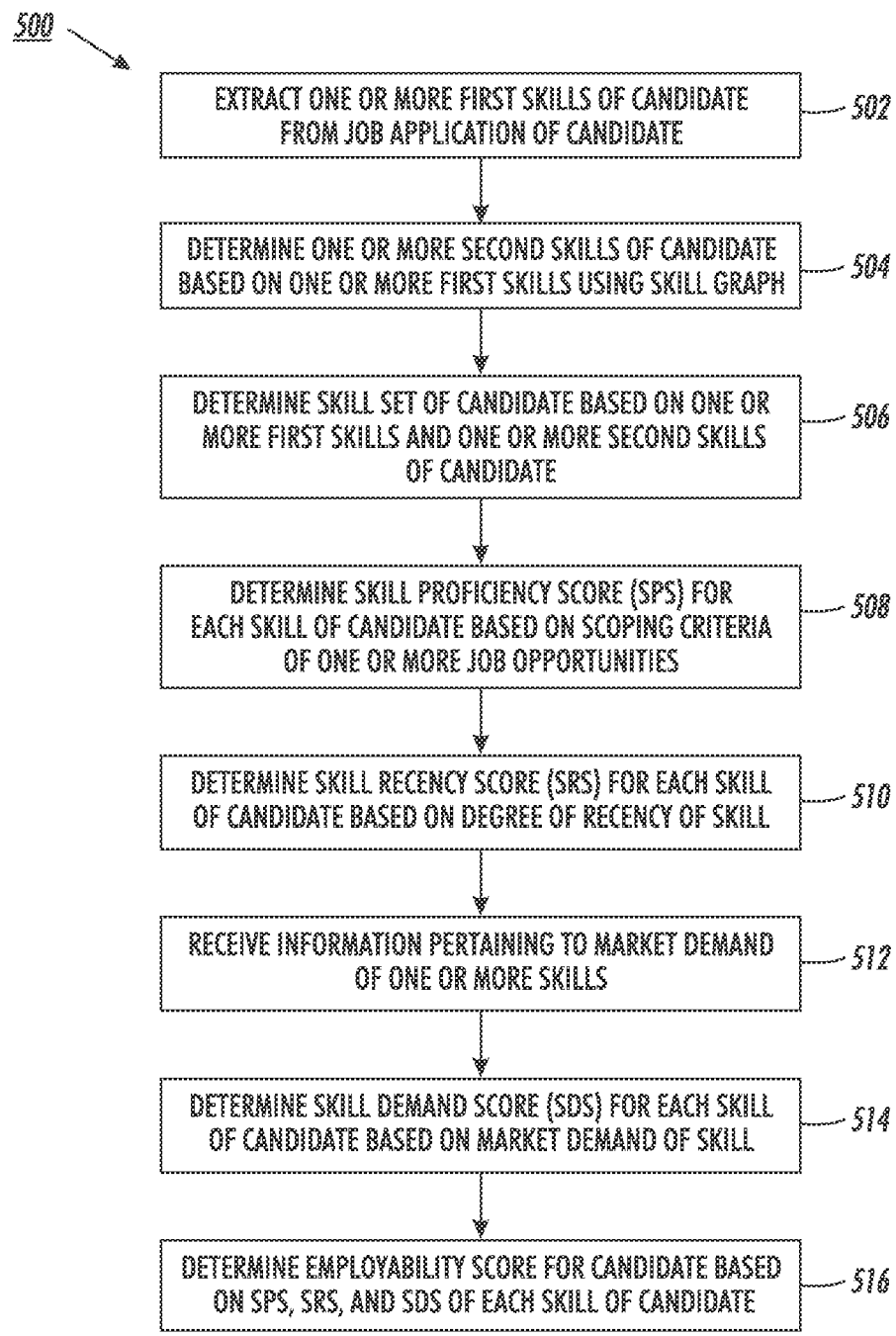
FIG. 5 illustrates a flowchart of a method for determining an employability score of a candidate, in accordance with at least one embodiment.

FIG. 5 is a flowchart 500 illustrating a method for determining an employability score of a candidate $C_i$, in accordance with at least one embodiment. The flowchart 500 is described in conjunction with FIG. 1, FIG. 2, and FIG. 6.

At step 502, the one or more first skills of the candidate $C_i$ are extracted. In an embodiment, the processor 202 is configured to extract the one or more first skills of the candidate $C_i$ from a job application of the candidate $C_i$. As discussed above, the job application of each of the one or more candidates may be in the form of an electronic document. Hence, to determine the one or more first skills of the candidate $C_i$, the processor 202 may employ one or more image processing operations (e.g., Optical Character Recognition, Intelligent Character Recognition, and so on) to identify a text in the electronic document. Thereafter, the processor 202 may employ one or more natural language processing techniques to extract the one or more first skills from the text identified from the electronic document associated with the job application of the candidate $C_i$. For instance, the text in the electronic document associated with the job application may be divided in various sections such as, but not limited to, "Name and contact details", "Title and tag-line", "Academic Qualifications", "Professional Experience", "Industry Domain", "Skills", "Awards & Accomplishments", and so on. The processor 202 may analyze the text in the individual sections (e.g., "Professional Experience", "Industry Domain", and "Skills") to extract the one or more first skills associated with the candidate.

A person skilled in the art will understand that the scope of the disclosure should not be limited to extracting the one or more first skills, as described above. The one or more first skills may be determined using various other techniques without departing from the spirit of the disclosure. For instance, while applying for the one or more job opportunities, through a user-interface of the candidate-computing device 106, the processor 202 may prompt the candidate $C_i$ to provide a list of skills possessed by the candidate $C_i$. Using the user-interface of the candidate-computing device 106, the candidate $C_i$ may provide the list of skills and thereafter upload the job application of the candidate $C_i$. The processor 202 may extract the one or more first skills from the list of skills. In another embodiment, the processor 202 may analyze a profile of the candidate $C_i$ on a job portal, a social media website (e.g., Facebook, LinkedIn, and so on), or any other online platform, to determine the one or more first skills of the candidate $C_i$.

At step 504, the one or more second skills of the candidate $C_i$ are determined based on the one or more first skills of the candidate $C_i$. In an embodiment, the processor 202 is configured to determine the one or more second skills based on the one or more first skills using a skill graph. In an embodiment, the skill graph may include one or more nodes, representing one or more skills, and one or more edges, representing a relationship among the one or more skills. In an embodiment, an edge in the skill graph between a first node, representing a first skill, and a second node, representing a second skill, may be deterministic of the second skill being determinable from the first skill. In an embodiment, a subject matter expert (SME) such as, but not limited to, a human resource professional, a recruiting manager, a project manager, a team leader, or any other professional involved in hiring personnel for an organization, may define the skill graph. The determination of the one or more second skills from the one or more first skills has been explained in conjunction with FIG. 6.

Figure 6:
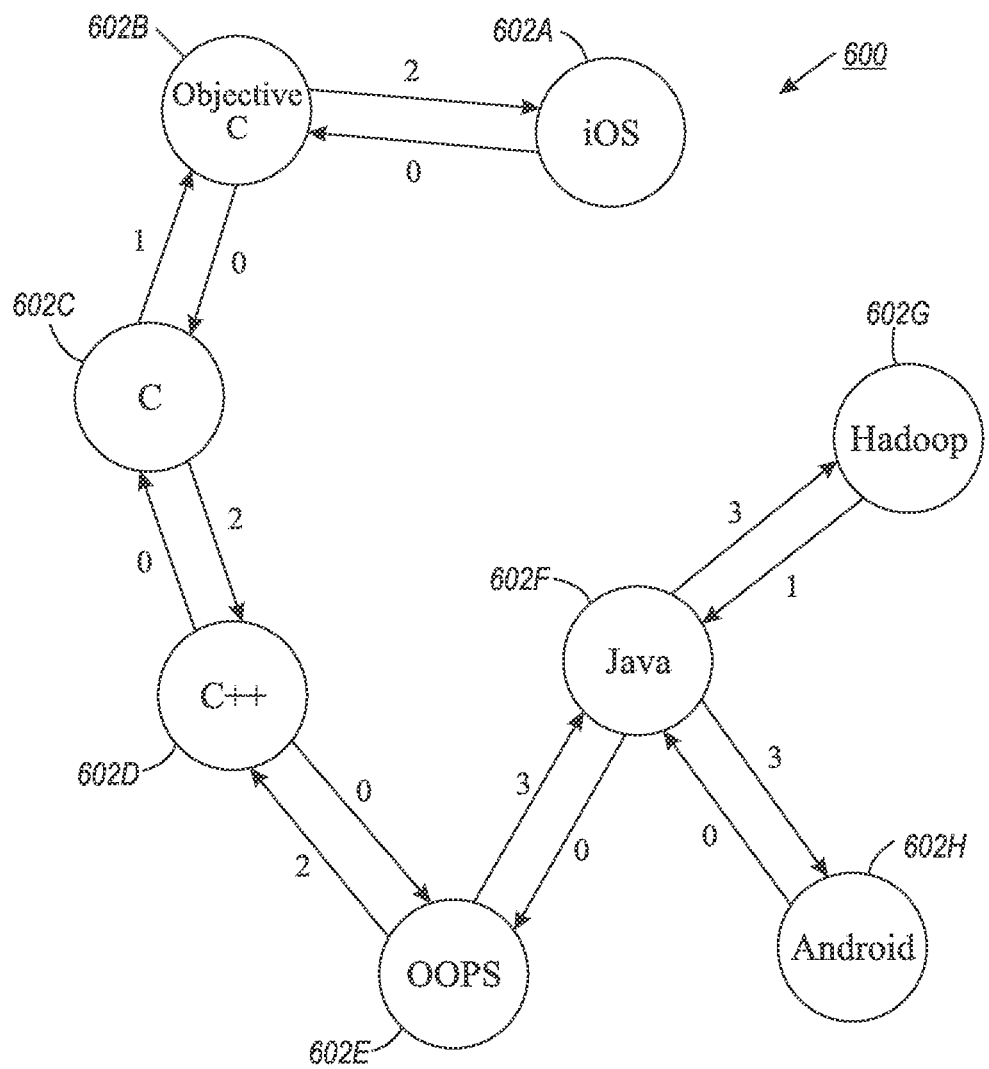
FIG. 6 illustrates an example skill graph, in accordance with at least one embodiment.

FIG. 6 illustrates an example skill graph 600, in accordance with at least one embodiment.

As shown in FIG. 6, the skill graph 600 includes various nodes, each of which may represent a skill. For instance, the skill graph 600 includes eight nodes representing the skills "iOS" (depicted by 602a), "Objective C" (depicted by 602b), "C" (depicted by 602c), "C++" (depicted by 602d), "OOPS" (depicted by 602e), "Java" (depicted by 602f), "Hadoop" (depicted by 602g), and "Android" (depicted by 602h). Further, as shown in FIG. 6, the various nodes of the skill graph 600 may be connected by directed edges, each of which may have a weight associated with it. The weight associated with a directed edge originating from a first node (representing a first skill) and terminating at a second node (representing a second skill) of the skill graph 600 may be indicative of an average time (or cost) involved in learning the second skill by the candidate, given that the candidate knows the first skill. In an embodiment, the second skill may be determined from the first skill based on the weight of the directed edge being less than a threshold weight (e.g., 0 months). For instance, as shown in FIG. 6, the weight of the directed edge from the node 602a (representing the skill "iOS") to the node 602b (representing the skill "Objective C") is zero (i.e., 0 months). Thus, the skill "Objective C" may be determinable from the skill "iOS". In other words, if a candidate possesses the skill "iOS", the candidate may also possess the skill "Objective C", as the skill "Objective C" may be essential to (and thus determinable from) the skill "iOS". However, as shown in FIG. 6, the weight of the directed edge from the node 602b to the node 602a is two (i.e., 2 months). This may indicate that a candidate possessing the skill "Objective C" may require 2 months to learn the skill "iOS". Hence, the skill "iOS" may not be determinable from the skill "Objective C". On the other hand, as shown in FIG. 6, the skill "C" (represented by the node 602c) may be determinable from the skill "Objective C" (represented by the node 602b) and the skill "C++" (represented by the node 602d), as the weights of the respective directed edges are 0. In other words, a candidate having the skill "Objective C" or "C++" may also have the skill "C". Similarly, as shown in FIG. 6, the skill "OOPS" (represented by the node 602d) may be determinable from the skills "C++" and "Java" (represented by the nodes 602d and 602f respectively). Further, the skill "Java" may be determinable from the skill "Android", as shown in FIG. 6. The processor 202 may determine the one or more second skills from the one or more first skills using the skill graph 600, in manner similar to that described above.

A person skilled in the art will understand that the examples of the skills in the skill graph 600 are for illustrative purpose and should not be construed to limit the scope of the disclosure.

Referring back to FIG. 5, at step 506, the skill set of the candidate $C_i$ is determined based on the one or more first skills and the one or more second skills of the candidate $C_i$. In an embodiment, the processor 202 is configured to determine the skill set of the candidate $C_i$ based on the one or more first skills (determined at step 502) and the one or more second skills (determined at step 504) of the candidate $C_i$. To determine the skill set of the candidate $C_i$, in an embodiment, the processor 202 may aggregate the one or more first skills and the one or more second skills. The following table illustrates an example of the one or more first skills extracted from the job application of the candidate $C_i$:

TABLE 1

Example of the one or more first skills of the candidate $C_i$

| Skill | Experience in months | Timeline |
|---|---|---|
| C++ | 22 | October 2009-December 2009; January 2011-July 2012 |
| Android | 25 | September 2012-Present |
| Adobe Flash | 12 | January 2010-December 2010 |

As illustrated in the above table, the one or more first skills of the candidate $C_i$ include "C++", "Android", and "Adobe Flash". The processor 202 may use the skill graph (e.g., the skill graph 600 of FIG. 6) to determine the one or more second skills from the one or more first skills. Thus, as discussed above, the skills "C" and "OOPS" may be determinable from the skill "C++". Further, the skill "Java" may be determinable from the skill "Android". Hence, the one or more second skills may include "C", "OOPS", and "Java". Further, the processor 202 may aggregate the one or more first skills and the one or more second skills to determine the skill set associated with the candidate $C_i$. The following table illustrates an example of the skill set of the candidate $C_i$, so determined:

TABLE 2

Example of the skill set of the candidate $C_i$

| Skill | Experience in months | Timeline |
|---|---|---|
| C++ | 22 | October 2009-December 2009; January 2011-July 2012 |
| Android | 25 | September 2012-Present |
| Adobe Flash | 12 | January 2010-December 2010 |
| C | 22 | October 2009-December 2009; January 2011-July 2012 |

TABLE 2-continued

Example of the skill set of the candidate $C_i$

| Skill | Experience in months | Timeline |
|---|---|---|
| OOPS | 47 | October 2009-December 2009; January 2011-July 2012; September 2012-Present |
| Java | 25 | September 2012-Present |

A person skilled in the art will understand that the examples of the skills in the Tables 1 and 2 are for illustrative purposes and should not be construed to limit the scope of the disclosure.

At step 508, the skill proficiency score (SPS) for each skill of the candidate $C_i$ is determined. In an embodiment, the processor 202 is configured to determine the SPS for each skill in the skill set of the candidate $C_i$ based on the one or more scoping criteria associated with the one or more job opportunities. In an embodiment, the SME may provide the one or more scoping criteria. Examples of the one or more scoping criteria include, but are not limited to, research publications, patents filed/granted, certifications, trainings, associations/affiliations, and endorsements. Further, the SME may define a weight for each skill scoping criteria. Based on the one or more scoping criteria, the weight of the respective scoping criteria, and corresponding values extracted from the skill set of the candidate $C_i$ for the one or more scoping criteria, the processor 202 may determine the SPS for each skill. The following table illustrates an example of values extracted from the skill set of the candidate $C_i$ for the one or more scoping criteria:

TABLE 3

Example of values extracted from the skill set of the candidate $C_i$ for the one or more scoping criteria

| Skills | Number of Research publications | Number of Patents | Number of Certifications | Number of trainings attended | Number of acknowledgements or endorsements |
|---|---|---|---|---|---|
| C++ | 0 | 0 | 0 | 0 | 8 |
| Android | 1 | 0 | 1 | 1 | 20 |
| Adobe Flash | 0 | 0 | 0 | 0 | 0 |
| Java | 2 | 0 | 0 | 0 | 10 |

As illustrated in the above table, the candidate $C_i$ received eight acknowledgements/endorsements for the skill "C++". Further, the candidate $C_i$ published one research paper, obtained one certification, attended one training, and received 20 acknowledgements/endorsements for the skill "Android", and so on. The following table illustrates an example of the weights that may be assigned by the SME to the one or more scoping criteria:

TABLE 4

Example of the weights assigned to the one or more scoping criteria

| Scoping Criteria | Scoping Criteria Weight (SCW) |
|---|---|
| Research/Publications | 5 |
| Patents | 5 |
| Certifications | 2 |
| Trainings | 2 |
| Acknowledge/Endorsements | 1 |

In an embodiment, the processor 202 may use the following equation to determine the SPS for each skill in the skill set of the candidate $C_i$:

$$(SPS_j)_i = \Sigma_{k=1}^{k=5} (\text{Scoping Criteria})_k * SCW_k \quad (4)$$

where, $(SPS_j)_i$: SPS for a skill j of the candidate $C_i$;

$(\text{Scoping Criteria})_k$: $k^{th}$ scoping criteria from the table 4 (e.g., $(\text{Scoping Criteria})_{k=1}$ is "Research/Publications"); and $SCW_k$: the scoping criteria weight assigned to the $k^{th}$ scoping criteria (refer to example of the weights in Table 4).

For example, referring to the Tables 3 and 4, the processor 202 may use the equation 4 to determine the SPS for the skill "C++" of the candidate $C_i$ as 8 (i.e., 0+0+0+0+8*1). Further, the processor 202 may determine the SPS for the skill "Android" for the candidate $C_i$ as 29 (i.e., 1*5+0+1*2+1*2+20*1). Similarly, the processor 202 may determine the SPS for the other skills of the candidate $C_i$.

At step 510, the skill recency score (SRS) for each skill of the candidate $C_i$ is determined. In an embodiment, the processor 202 is configured to determine the SRS for each skill in the skill set of the candidate $C_i$ based on a chronology of usage of the respective skill by the candidate $C_i$. In an embodiment, the SRS for a particular skill of a candidate may be indicative of how recently the candidate used that particular skill. In an embodiment, the processor 202 may analyze the skill set of the candidate $C_i$ to determine the chronology of usage of each skill by the candidate $C_i$. Thereafter, the processor 202 may represent the determined chronology of usage of each skill along one or more recency timelines. In an embodiment, the SME may assign recency weights to each recency timeline. The following table illustrates an example of the recency weights assigned by the SME to recency timelines arranged in a reversed chronological order:

TABLE 5

Example of the recency weights assigned to the recency timelines

| Recency Timeline | Recency Weight (RW) |
|---|---|
| Last 12 Months | 1 |
| 12-24 Months | 0.9 |
| 24-36 Months | 0.8 |
| 36-48 Months | 0.7 |
| 48-60 Months | 0.6 |
| Beyond 60 Months | 0.5 |

For example, as illustrated in the above table, the recency weight assigned to a usage of a skill during the last 12 months is one. Further, the recency weight for a usage of a skill between 12 to 24 months is 0.9, and so on. In an embodiment, the processor 202 may segregate the duration of experience of each skill of the candidate $C_i$ into the various recency timelines, as illustrated in the Table 5. Referring to the example of the skill set of the candidate $C_i$ in the Table 2, the following table illustrates an example of the segregated duration of experience of the skill "C++" of the candidate $C_i$ into the various recency timelines:

TABLE 6

Example of the segregation of the duration of experience of the skill "C++" of the candidate $C_i$ into the various recency timelines

| Skill | Recency Timeline | Number of months used |
| --- | --- | --- |
| C++ | Last 12 Months | 0 |
| C++ | 12-24 Months | 0 |
| C++ | 24-36 Months | 10 |
| C++ | 36-48 Months | 9 |
| C++ | 48-60 Months | 3 |
| C++ | Beyond 60 Months | 0 |

Referring to Table 6, the candidate $C_i$ has a total of 22 months experience in the skill "C++" spread across three recency timelines. For instance, the candidate $C_i$ has 10 months experience of the skill "C++" during the recency timeline 24-36 months. Further, the candidate $C_i$ has 9 and 3 months experience, respectively, during the recency timelines 36-48 months and 48-60 months.

In an embodiment, after segregating the duration of experience of each skill of the candidate $C_i$ in the various recency timelines, the processor 202 may use the following equation to determine the SRS for the respective skill:

$$(SPS_j)_i = \Sigma_{k=1}^{k=6}(\text{No. of months used})_k * RW_k * SMW \quad (5)$$

where, $(SRS_j)_i$: SRS for a skill j of the candidate $C_i$;

(No. of months used)$_k$: number of months that the skill j is used in $k^{th}$ recency timeline (e.g., referring to the Table 6, for the skill "C++", (No. of months used)$_{k=3}$ is 10);

$RW_k$: recency weight assigned to the $k^{th}$ recency timeline (refer to example of the recency weights in Table 5); and SMW: a skill month weight (which may be assigned by the SME, e.g., SMW=3).

For example, referring to the Tables 5 and 6, the processor 202 may use the equation 5 to determine the SRS for the skill "C++" of the candidate $C_i$ as 48.3 (i.e., (0+0+0.8*10+0.7*9+0.6*3+0)*3). Further, the processor 202 may determine the SRS for the skill "Android" for the candidate $C_i$ as 63.6. Similarly, the processor 202 may determine the SRS for the other skills of the candidate $C_i$.

At step 512, information pertaining to the market demand of one or more skills is received. In an embodiment, the processor 202 is configured to receive the information pertaining to the one or more skills (including the skills in the skill set of the candidate Ci) from one or more sources such as, but not limited to, one or more recruitment agencies, one or more employment portals, one or more labor market associations, one or more human resource providers, or one or human resource consultants. For example, the processor 202 may retrieve information pertaining to trending skills associated with a particular industry using one or more external Application Programming Interfaces (APIs) such as, but not limited to, Indeed API, CareerBuilder, and BizVizz. The following table illustrates an example of the information pertaining to the market demand of the one or more skills:

TABLE 7

Example of the information pertaining to the market demand of the one or more skills

| Trending Skills | Market Demand Weight (MDW) |
| --- | --- |
| HTML5 | 5.0 |
| MongoDB | 4.6 |
| iOS | 4.2 |
| Android | 3.8 |
| Mobile App | 3.4 |
| Puppet | 3.0 |
| Hadoop | 2.6 |
| jQuery | 2.2 |
| PaaS | 1.8 |
| Social Media | 1.4 |

A person skilled in the art will understand that the examples of the trending skills and their respective market demand weights are for illustrative purpose and should not be construed to limit the scope of the disclosure. Further, the information pertaining to the market demand for the one or more skills may include various other types of information related to the one or more skills.

Further, a person skilled in the art will understand that the information pertaining to the market demand of the one or more skills may be obtained from any other information source without departing from the scope of the disclosure. In addition, the step 512 may be at any chronological position in the flowchart 500 before the step 514 without departing from the scope of the disclosure.

At step 514, the skill demand score (SDS) for each skill of the candidate $C_i$ is determined. In an embodiment, the processor 202 is configured to determine the SDS for each skill in the skill set of the candidate $C_i$ based on the market demand of the respective skill. As discussed above, the processor 202 may receive the information pertaining to the market demand of the one or more skills. For instance, the information pertaining to the market demand may include the market demand weight assigned to each trending skill in a particular industry (e.g., information technology). In an embodiment, the processor 202 may determine the SDS for each skill of the candidate $C_i$ using the following equation:

$$(SDS_j)_i = (SPS_j)_i * (SRS_j)_i * MDW_j \quad (6)$$

where, $(SDS_j)_i$: SDS for a skill j of the candidate $C_i$;

$(SPS_j)_i$: SPS for the skill j of the candidate $C_i$;

$(SRS_j)_i$: SRS for the skill j of the candidate $C_i$; and $MDW_j$: market demand weight for the skill j (where, MDWi=0.0001 if the skill j is not a trending skill, as per the information pertaining to the market demand of the skills).

For example, as discussed above, the SPS and the SRS for the skill "C++" of the candidate $C_i$ may be determined as 8 and 48.3 respectively. Referring to the table 7, the skill "C++" is not a trending skill. Hence, the MDW for the skill "C++" may be considered as 0.0001. Using the equation 6, the processor 202 may determine the SDS for the skill "C++" of the candidate $C_i$ as 0.00563 (i.e., (8+48.3)*0.0001). Further, the processor 202 may determine the SDS for the skill "Android" for the candidate $C_i$ as 351.8799. Similarly, the processor 202 may determine the SDS for the other skills of the candidate $C_i$.

A person skilled in the art will understand that when a skill is not a trending skill, as per the market demand information, the parameter MDW may be assigned any value (e.g., value between 0 and 1) without departing from the scope of the disclosure.

At step 516, the employability score (ES) of the candidate $C_i$ is determined. In an embodiment, the processor 202 is configured to determine the employability score (ES) of the candidate $C_i$ based on the SPS, the SRS, and the SDS for each skill in the skill set of the candidate $C_i$. The following table illustrates an example of the values of the SPS, the SRS, and the SDS determined for the various skills in the skill set of the candidate $C_i$:

TABLE 8

Example of values of the SPS, the SRS, and the SDS determined for the various skills in the skill set of the candidate $C_i$

| Skill | SPS | SRS | SDS |
|---|---|---|---|
| C++ | 8 | 48.3 | 0.00563 |
| Android | 29 | 63.6 | 351.8799 |
| Adobe Flash | 0 | 20.07 | 0.002007 |
| C | 0 | 48.3 | 0.00483 |
| OOPS | 0 | 121.5 | 0.01215 |
| Java | 20 | 63.6 | 0.00836 |

In an embodiment, the processor 202 may use the following equation to determine the employability score of the candidate $C_i$:

$$ES_i = \Sigma_{k=1}^{k=q} SDS_k \qquad (7)$$

where, $ES_i$: the employability score (ES) of the candidate $C_i$;

q: total number of skills in the skill set of the candidate $C_i$; and $SDS_k$: the skill demand score (SDS) of a skill k in the skill set of the candidate $C_i$.

For instance, referring to the Table 8, the processor 202 may use the equation 7 to determine the employability score (ES) of the candidate $C_i$ as 351.914 (i.e., 0.00563+ 351.8799+0.002007+0.00483+0.01215+0.00836).

A person skilled in the art will understand that the aforementioned examples are for illustrative purpose and should be construed to limit the scope of the disclosure.

A person skilled in the art will understand that the scope of the disclosure should not be limited to using the employability score of the one or more candidates for screening the one or more candidates for the one or more job opportunities. In an embodiment, the employability score of the one or more candidates may be utilizable for various other purposes without departing from the spirit of the disclosure.

In an embodiment, a financial institution may use the employability score of a candidate to determine a financial risk associated with the candidate. In such a scenario, the one or more scoping criteria may be related to one or more of a current job of the candidate, one or more past jobs of the candidate, or one or more prospective jobs of the candidate. Based on the employability score of the candidate, the financial institution may determine a capability of the candidate to remain entrenched in an organization and grow in his/her career. Further, financial institution may determine the financial risk associated with the candidate based on the determined capability of the candidate. For instance, a candidate having a high employability score may not be unemployed for a long time. Further, such a candidate may have a low risk of losing his/her job. This may ensure a regular source of income for such candidates. Thus, candidates with higher employability scores may have a lesser financial risk associated with them.

In another embodiment, an organization may determine the employability scores of its existing employees to identify promising/highly capable employees. The organization may then focus on keeping such employees entrenched with the organization by offering bonuses, awards, etc. Further, based on the employability scores (and the other scores such as SPS, SRS, and SDS) of the employees, the organization may identify training needs of its employees. The organization may also identify employees who require training in specific skills. Based on such analysis, the organization may design training programs for its employees.

Various embodiments of the disclosure encompass numerous advantages including methods and systems for screening one or more candidates for one or more job opportunities. As discussed above, if the decision to select a candidate for a job opening is delayed, the organization may risk losing out the candidate. On the contrary, if a candidate is selected for a job opening immediately, the organization may risk missing better skilled candidates who may be sourced for the job opening by the organization in future. To solve the aforementioned problem, the disclosure provides for grouping of candidates into one or more batches based on chronology of reception of job applications of the candidates such that each batch may include at most a predetermine number of candidates, and each batch may be formed after a predetermined time-duration. For instance, a batch-1 may be formed with candidates whose job applications are received in a week-1. Further, a batch-2 may be formed with candidates whose job applications are received in a week-2 (i.e., the week succeeding the week-1). Thus, the batch-1 may chronologically precede the batch-2. Further, as discussed above, a sliding window is moved over the one or more batches such that a predetermined number of batches are encompassed within the sliding window at any given time. Candidates in each batch may be ranked based on a score assigned to them during an interview, their hiring cost, their skill set, their employability score, or a combination thereof. When a new batch is created, the sliding window may move by one batch, such that the chronologically next batch from the one or more batches may be added to the sliding window, and the chronologically oldest batch may be deleted from the sliding window. At this stage, the top ranking candidates from the chronologically oldest batch (i.e., the batch deleted from the sliding window) may be selected for the job openings. Thus, the decision of selection of the candidates may neither be delayed indefinitely nor be taken immediately, thereby leading to a near-optimal solution for the problem of selection of candidates.

Further, as discussed above, the employability score of a candidate may be used by financial institutions to determine a financial risk associated with the candidate. Further, an organization may determine the employability scores of its existing employees to determine highly capable employees, which the organization may want to keep entrenched. In addition, based on the employability scores of the employees, the organization may determine training needs of the employees, and thereafter design training programs for the employees.

The disclosed methods and systems, as illustrated in the ongoing description or any of its components, may be embodied in the form of a computer system. Typical examples of a computer system include a general-purpose computer, a programmed microprocessor, a micro-controller, a peripheral integrated circuit element, and other devices, or arrangements of devices that are capable of implementing the steps that constitute the method of the disclosure.

The computer system comprises a computer, an input device, a display unit, and the internet. The computer further comprises a microprocessor. The microprocessor is connected to a communication bus. The computer also includes a memory. The memory may be RAM or ROM. The computer system further comprises a storage device, which may be a HDD or a removable storage drive such as a floppy-disk drive, an optical-disk drive, and the like. The storage device may also be a means for loading computer programs or other instructions onto the computer system. The computer system also includes a communication unit. The communication unit allows the computer to connect to other databases and the internet through an input/output (I/O) interface, allowing the transfer as well as reception of data from other sources. The communication unit may include a modem, an Ethernet card, or similar devices that enable the computer system to connect to databases and networks such as LAN, MAN, WAN, and the internet. The computer system facilitates input from a user through input devices accessible to the system through the I/O interface.

To process input data, the computer system executes a set of instructions stored in one or more storage elements. The storage elements may also hold data or other information, as desired. The storage element may be in the form of an information source or a physical memory element present in the processing machine.

The programmable or computer-readable instructions may include various commands that instruct the processing machine to perform specific tasks such as steps that constitute the method of the disclosure. The systems and methods described can also be implemented using only software programming, only hardware, or a varying combination of the two techniques. The disclosure is independent of the programming language and the operating system used in the computers. The instructions for the disclosure can be written in all programming languages including, but not limited to, "C," "C++," "Visual C++," and "Visual Basic". Further, software may be in the form of a collection of separate programs, a program module containing a larger program, or a portion of a program module, as discussed in the ongoing description. The software may also include modular programming in the form of object-oriented programming. The processing of input data by the processing machine may be in response to user commands, the results of previous processing, or from a request made by another processing machine. The disclosure can also be implemented in various operating systems and platforms, including, but not limited to, "Unix," "DOS," "Android," "Symbian," and "Linux".

The programmable instructions can be stored and transmitted on a computer-readable medium. The disclosure can also be embodied in a computer program product comprising a computer-readable medium, with any product capable of implementing the above methods and systems, or the numerous possible variations thereof.

Various embodiments of the methods and systems for managing one or more human resource (HR) functions in an organization have been disclosed. However, it should be apparent to those skilled in the art that modifications, in addition to those described, are possible without departing from the inventive concepts herein. The embodiments, therefore, are not restrictive, except in the spirit of the disclosure. Moreover, in interpreting the disclosure, all terms should be understood in the broadest possible manner consistent with the context. In particular, the terms "comprises" and "comprising" should be interpreted as referring to elements, components, or steps, in a non-exclusive manner, indicating that the referenced elements, components, or steps may be present, used, or combined with other elements, components, or steps that are not expressly referenced.

A person with ordinary skills in the art will appreciate that the systems, modules, and sub-modules have been illustrated and explained to serve as examples and should not be considered limiting in any manner. It will be further appreciated that the variants of the above disclosed system elements, modules, and other features and functions, or alternatives thereof, may be combined to create other different systems or applications.

Those skilled in the art will appreciate that any of the aforementioned steps and/or system modules may be suitably replaced, reordered, or removed, and additional steps and/or system modules may be inserted, depending on the needs of a particular application. In addition, the systems of the aforementioned embodiments may be implemented using a wide variety of suitable processes and system modules, and are not limited to any particular computer hardware, software, middleware, firmware, microcode, and the like.

The claims can encompass embodiments for hardware and software, or a combination thereof.

It will be appreciated that variants of the above disclosed, and other features and functions or alternatives thereof, may be combined into many other different systems or applications. Presently unforeseen or unanticipated alternatives, modifications, variations, or improvements therein may be subsequently made by those skilled in the art that are also intended to be encompassed by the following claims.

What is claimed is:

1. A method of operating a candidate screening system, the method comprising:
   receiving, by a processor of the candidate screening system, job applications from candidates;
   grouping, by the processor, in real time as the job applications are received, the candidates into one or more batches based on a predetermined time duration, a count of candidates, and a chronology of reception of the job applications from the candidates, each batch of the one or more batches comprising a set of candidates from the candidates;
   generating, by the processor, a sliding window superimposed over the one or more batches, the sliding window being a virtual window in a memory of the candidate screening system, the sliding window encompassing a first sequence of batches, comprised by the one or more batches, at a first time instance, wherein a length of the sliding window corresponds to a time interval within which the first sequence of batches are created, the first sequence of batches comprising an oldest batch chronologically in the sequence;
   for each batch in the first sequence of batches encompassed by the sliding window, ranking, by the processor, the set of candidates in the batch based on a score assigned to each candidate, wherein the score is determined based on a dot product between a candidate skill vector representing skills of each candidate and a required skill vector representing required skills of a job opportunity;
   creating, by the processor, a new batch of candidates comprised by the one or more batches;
   in response to creating the new batch of candidates, at a second time instance, moving, by the processor, the sliding window to encompass a second sequence of batches comprising the new batch of candidates, thereby deleting the chronologically oldest batch from the sliding window;

selecting a predetermined number of top ranking candidates as a subset of candidates from the chronologically oldest batch encompassed by the sliding window at the first time instance for the job opportunity, wherein the set of candidates from the chronologically oldest batch comprises the subset, constituting a first set and a first subset of candidates respectively; and displaying the first subset of candidates through a user-interface of a recruiter-computing device.

2. The method of claim 1, further comprising:

extracting one or more first skills associated with each candidate in the first set of candidates from a respective job application of each candidate in the first set of candidates; and determining one or more second skills from the one or more first skills using a skill graph.

3. The method of claim 2, wherein the skill graph includes one or more nodes representative of one or more skills, and one or more edges representative of a relationship among the one or more skills, wherein an edge in the skill graph between a first node representing a first skill, and a second node representing a second skill, is deterministic of the second skill being determinable from the first skill.

4. The method of claim 2, further comprising determining a skill set associated with each candidate in the first set of candidates based on the one or more first skills and the one or more second skills associated with the each candidate in the first set of candidates.

5. The method of claim 4, further comprising:

determining a skill proficiency score for each skill in the skill set associated with each candidate in the first set of candidates, based at least on one or more scoping criteria associated with the job opportunity;

determining a skill recency score for each skill in the skill set associated with each candidate in the first set of candidates, based on a chronology of usage of each skill by each candidate; and determining a skill demand score for each skill in the skill set associated with each candidate in the first set of candidates, based on a market demand of each skill.

6. The method of claim 5, further comprising receiving information pertaining to the market demand of each skill from one or more of recruitment agencies, employment portals, labor market associations, human resource providers, or one or more human resource consultants.

7. The method of claim 5, further comprising:

determining an employability score for each candidate in the first set of candidates based on the skill proficiency score, the skill recency score, and the skill demand score, associated with each skill in the skill set associated with each candidate of the first set of candidates; and ranking each candidate in the first set of candidates, with respect to other candidates in the first set of candidates, based on one or more of the employability score, the score assigned during an interview, or a hiring cost associated with each candidate in the first set of candidates.

8. The method of claim 7, wherein the first subset of candidates are identified from the first set of candidates from the chronologically oldest batch based on the ranking of each candidate in the first set of candidates.

9. The method of claim 7, wherein the ranking of each candidate in the first set of candidates is modifiable based on a user-input through the user-interface of the recruiter-computing device.

10. The method of claim 1, further comprising updating a skill requirement associated with the job opportunity based on a skill set associated with each candidate in a second set of candidates identified from a batch encompassed in the sliding window at the second time instance.

11. The method of claim 1, wherein a candidate is removable from the first subset of candidates based on a user-input through the user-interface of the recruiter-computing device.

12. The method of claim 1, further comprising specifying the length of the sliding window through the user-interface.

13. A candidate screening system comprising:

an application server comprising a memory and one or more processors configured to:

receive job applications from candidates;

group, in real time as the job applications are received, the candidates into one or more batches based on a predetermined time duration, a count of candidates, and a chronology of reception of the job applications from the candidates, each batch of the one or more batches comprising a set of candidates from the candidates;

generating a sliding window superimposed over the one or more batches, the sliding window being a virtual window in the memory, the sliding window encompassing a first sequence of batches, at a first time instance, wherein a length of the sliding window corresponds to a time interval within which the first sequence of batches are created, the first sequence of batches comprising an oldest batch chronologically in the sequence;

for each batch in the first sequence of batches encompassed by the sliding window, rank the set of candidates in the batch based on a score assigned to each candidate, wherein the score is determined based on a dot product between a candidate skill vector representing skills of each candidate and a required skill vector representing required skills of a job opportunity;

create a new batch of candidates comprised by the one or more batches;

in response to creating the new batch of candidates, at a second time instance, move, the sliding window to encompass a second sequence of batches comprising the new batch of candidates and, thereby, delete the chronologically oldest batch from the sliding window; and select a predetermined number of top ranking candidates as a subset of candidates from the chronologically oldest batch encompassed by the sliding window at the first time instance for one of the job opportunity, wherein the set of candidates from the chronologically oldest batch comprises the subset, constituting a first set and a first subset of candidates respectively; and a recruiter-computing device configured to display the first subset of candidates through a user-interface.

14. The system of claim 13, wherein the one or more processors are further configured to determine a skill proficiency score for each skill in a skill set associated with each candidate in the first set of candidates, based at least on one or more scoping criteria associated with the job opportunity.

15. The system of claim 14, wherein the one or more processors are further configured to determine a skill recency score for each skill in the skill set associated with each candidate in the first set of candidates, based on a chronology of usage of each skill by each candidate.

16. The system of claim 15, wherein:
the one or more processors are further configured to determine a skill demand score for each skill in the skill set associated with each candidate in the first set of candidates, based on a market demand of each skill; and
the one or more processors are further configured to determine an employability score for each candidate in the first set of candidates based on the skill proficiency score, the skill recency score, and the skill demand score, associated with each skill in the skill set associated with each candidate of the first set of candidates.

17. The system of claim 16, wherein:
the one or more processors are further configured to rank each candidate in the first set of candidates, with respect to other candidates in the first set of candidates, based on one or more of the employability score, the score assigned during an interview, or a hiring cost associated with the each candidate in the first set of candidates; and
the first subset of candidates is identified from the first set of candidates from the chronologically oldest batch based on the ranking of each candidate in the first set of candidates.

18. The system of claim 13, wherein the one or more processors are further configured to update a skill requirement associated with the job opportunities based on a skill set associated with each candidate in a second subset of candidates identified from the new batch encompassed in the sliding window at the second time instance.

19. The system of claim 13, wherein the recruiter-computing device is further configured to receive an input for specifying the length of the sliding window through the user-interface.

20. A computer program product for use with a candidate screening system comprising an application server, the computer program product comprising a non-transitory computer readable medium, the non-transitory computer readable medium stores a computer program code, the computer program code is executable by one or more processors in the application server to:

receive job applications from candidates;
group, in real time as the job applications are received, the candidates into one or more batches based on a predetermined time duration, a count of candidates, and a chronology of reception of the job applications from the candidates, each batch of the one or more batches comprising a set of candidates from the candidates;
generate a sliding window superimposed over the one or more batches, the sliding window being a virtual window in a memory of the candidate screening system, the sliding window encompassing a first sequence of batches, at a first time instance, wherein a length of the sliding window corresponds to a time interval within which the first sequence of batches are created, the first sequence of batches comprising an oldest batch chronologically in the sequence;
for each batch in the first batches encompassed by the sliding window, rank the set of candidates in the batch based on a score assigned to each candidate, wherein the score is determined based on a dot product between a candidate skill vector representing skills of each candidate and a required skill vector representing required skills of a job opportunity;
create a new batch of candidates comprised by the one or more batches;
in response to creating the new batch of candidates, at a second time instance, move the sliding window to encompass a second sequence of batches comprising the new batch of candidates and, thereby, delete the chronologically oldest batch from the sliding window;
select a predetermined number of top ranking candidates as a subset of candidates from the chronologically oldest batch encompassed by the sliding window at the first time instance for one of the job opportunity, wherein the set of candidates from the chronologically oldest batch comprises the subset, constituting a first set and a first subset of candidates respectively; and
displaying the first subset of candidates through a user-interface of a recruiter-computing device.

21. The computer program product of claim 20, wherein the computer program code is executable by one or more processors in the application server to further receive an input for specifying the length of the sliding window through the user-interface.

* * * * *